(12) United States Patent
Facey et al.

(10) Patent No.: US 7,476,069 B2
(45) Date of Patent: Jan. 13, 2009

(54) CAP FOR PALLETISED LOADS

(75) Inventors: Hugh David Facey, Sheffield (GB); Brian Edward Shawcross, Nottinghamshire (GB); Derek Boaler, Sheffield (GB); John Makin, South Yorkshire (GB); Lee Mark Giemza, Wakefield (GB)

(73) Assignee: Loadhog Limited (GB)

( * ) Notice: Subject to any disclaimer, the term of this patent is extended or adjusted under 35 U.S.C. 154(b) by 55 days.

(21) Appl. No.: 11/775,345

(22) Filed: Jul. 10, 2007

(65) Prior Publication Data

US 2008/0014037 A1 Jan. 17, 2008

Related U.S. Application Data

(62) Division of application No. 10/530,960, filed as application No. PCT/GB2004/002166 on May 20, 2004, now Pat. No. 7,311,484.

(30) Foreign Application Priority Data

| Jun. 4, 2003 | (GB) | ................................. | 0312791.7 |
| Sep. 26, 2003 | (GB) | ................................. | 0322549.7 |

(51) Int. Cl.
*B60P 7/08* (2006.01)

(52) U.S. Cl. ............................. 410/100; 410/46; 410/97

(58) Field of Classification Search .................. 410/46, 410/96, 97, 99, 100; 206/597; 108/55.1, 108/53.33

See application file for complete search history.

(56) References Cited

U.S. PATENT DOCUMENTS

| 3,602,065 | A | 8/1971 | Ratcliff |
| 3,848,889 | A | 11/1974 | Sharrow |
| 6,821,068 | B2 | 11/2004 | Facey et al. |
| 6,929,438 | B1 * | 8/2005 | Foster et al. ................... 410/46 |
| 7,311,484 | B2 * | 12/2007 | Facey et al. ................. 410/100 |

FOREIGN PATENT DOCUMENTS

| GB | 734 002 | 7/1955 |
| WO | 01/96203 A1 | 12/2001 |

* cited by examiner

*Primary Examiner*—Stephen Gordon
(74) *Attorney, Agent, or Firm*—Trexler, Bushnell, Giangiorgi, Blackstone & Marr, Ltd.

(57) ABSTRACT

A cap for use on a palletized load has a main mauling providing housings at a pair or two pairs of opposite sides for a cassette in which a strap passes through a slotted crossbar between a drum and a hook having two prongs for engaging the underside of the platform of a pallet (e.g. at each side of a middle spacer), the strap then being tensioned by a linkage between the slotted crossbar and a lever within a slot for swinging between an inoperative position and an operative position (e.g. up to 90° thereto) to rotate the crossbar to wind the strap thereon.

13 Claims, 18 Drawing Sheets

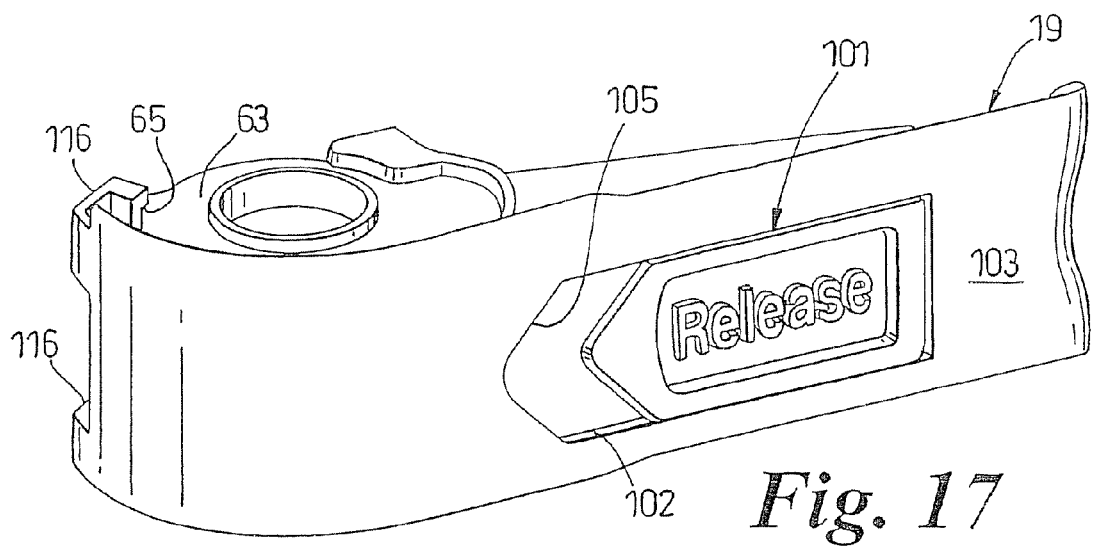
Fig. 17
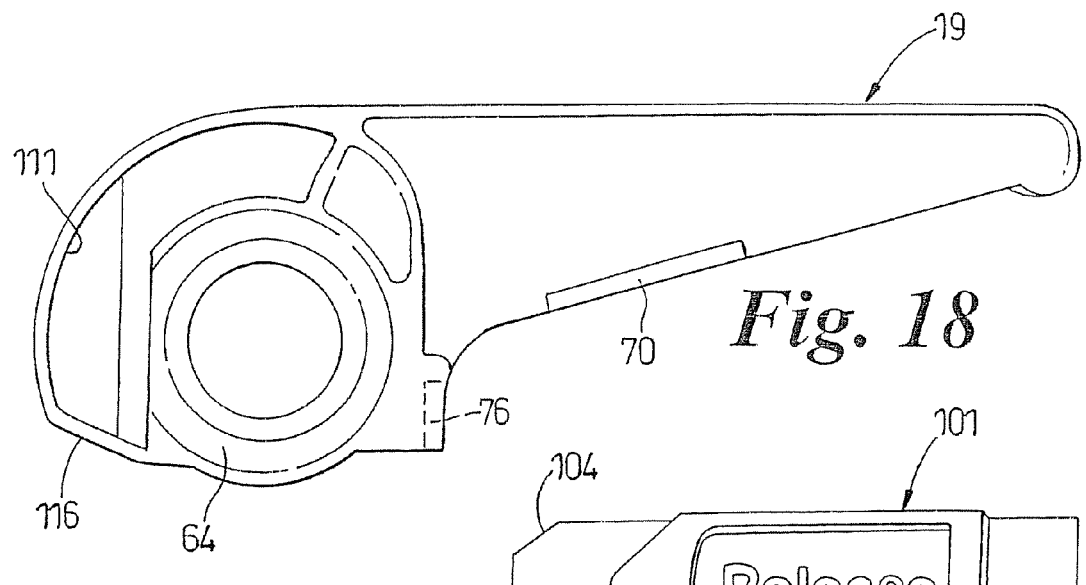
Fig. 18
Fig. 19
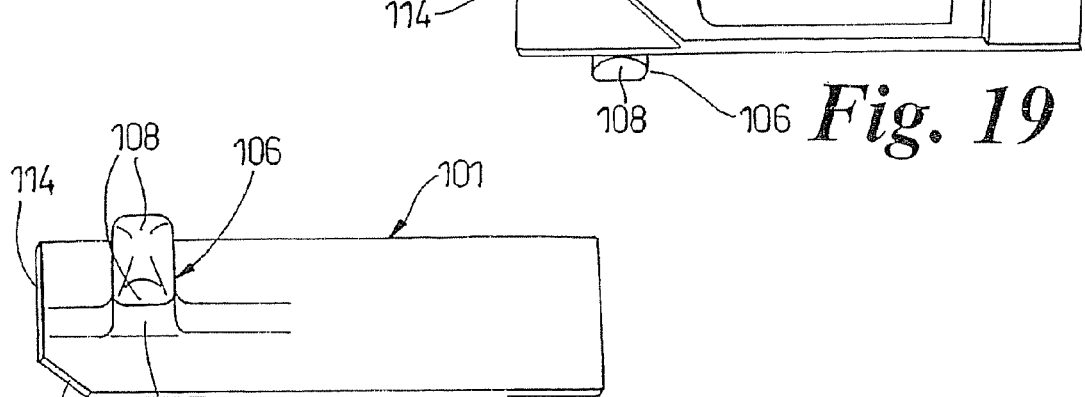
Fig. 20

CAP FOR PALLETISED LOADS

RELATED APPLICATION (PRIORITY CLAIM)

This patent application is a divisional of U.S. patent application Ser. No. 10/530,960, filed on Apr. 11, 2005 now U.S. Pat. No. 7,311,484, which was a National Phase filing regarding International Application No. PCT/GB2004/002166, which relies upon British Application Nos. 0312791.7 and 0322549.7 for priority.

BACKGROUND OF THE INVENTION

This invention relates to a cap for use on palletised loads, more particularly the type of cap having at least two strapping strands retractable into housings through openings at opposite sides (at least) of the cap, spring means within the housings for retracting the strapping strands, hooks on the free ends of the strapping strands for engagement with the underside of the platform of a pallet (e.g. a 2-way or 4-way pallet), tensioning means within the housings for tightening the strapping strands between the cap and the pallet after interposing a load between the cap and the pallet, and stop means for limiting retraction of the hooks into the housings when not engaged with a pallet.

Such a cap can be used without need to modify existing pallets, particularly—but not exclusively—those made of wood. The preferred form of hook has two prongs spaced apart so as to fit one to each side of a middle spacer of a pallet, without being in danger of damage or dislodgement by the forks of a fork-lift truck.

Two such caps are to be found in WO-A-01/96203.

In one of those caps each strapping strand is a wire or non-metallic rope retractably wound spirally on a 'thin' reel within the respective housing and having a short cylindrical core between annular flanges spaced apart by negligibly more than the overall diameter of the rope, so that the rope will be wound spirally on the core, the axis of the reel being perpendicular to the general plane of the cap, the core being on a shaft rotatably mounted within the housing, there also being provided a rewind spring coiled round the shaft alongside the reel, stop means limiting the extent to which the hook can be drawn into the housing by the action of the rewind spring, a ratchet concentric with the reel and rotatable with the reel and shaft, with a pawl for engaging teeth on the ratchet to stop or prevent pulling of the rope from the reel, and manually-operable means for tensioning the rope when the pawl has been engaged with a tooth on the ratchet, particularly characterized in that each tooth of the ratchet has a pawl-engageable face inclined forwardly from its radially inner end with respect to a radial line from the axis of the shaft through said radially inner end of said face and with respect to the direction of unwinding of the rope from the reel, the pawl has a complementary face for mutual engagement with said face of any one tooth of the ratchet, the pawl is provided with spring-loading means with manually-operable means for changing the effect of the spring loading over between urging the pawl into engagement with the ratchet and towards a position holding the pawl clear of the ratchet, and in that the manually-operable tensioning means is by way of a separate wrench engageable with one end of the shaft. While the reel can accommodate an adequate length of rope; and a separate wrench can have such a length of handle as to enable adequate tension to be applied to each wire or rope, application of the wrench to the cap when placed on a load of a height of, say, two meters is very difficult, even for a person of above average height. Likewise, access to the manually-operable change-over means for the ratchet is very difficult, especially as the change-over cannot be effected without use of the wrench for slight additional tensioning of the wire or rope to free the pawl from the ratchet.

In the other cap each strapping strand is a strap, there being within the respective housing parallel guides between ends of the housing, at one end of which is the opening; a crosshead slidable along the guides towards and away from the opening, the crosshead being mainly constituted by crossbars of graduated diameters; a fixed array of graduated crossbars adjacent the opposite end of the housing from the crosshead, the axes of the crossbars in the crosshead and the fixed array all being in a common plane with the smallest diameter crossbars being the nearest to each other, the strap having its inner end secured to one of the smallest diameter crossbars and being lapped in multi-purchase array round the other smallest diameter crossbar and each successively greater diameter crossbar in the crosshead and fixed array in turn, and with the final lap of the strap emerging from the opening in the housing, and spring means to urge the crosshead away from the fixed array; the total length of strap that can be accommodated being principally dependent on the number and lengths of laps between the crosshead and the fixed array, and the number of laps being determined by the number of crossbars in the crosshead and in the fixed array (e.g. three crossbars in one and two in the other giving five laps), the diameters of the crossbars can be but a few millimeters each consistent with being strong enough to carry the loads in the strap generated by the spring means, the tensioning means being a lever with an over-center locking action rotating a slotted crossbar through which the strap passes. The length of strap that can be accommodated is very limited; and the length of the lever and the extent to which it can rotate the slotted crossbar are so limited that adequate tension in the straps is difficult to achieve, especially in view of elasticity/stretchability of the straps.

BRIEF SUMMARY OF THE INVENTION

Therefore, the object of the present invention is to provide a cap for palletized loads with which adequate tension can be applied to the strapping strands by means accessible at all times from the sides of the cap.

According to the present invention, a cap of the type initially defined has each tensioning means comprising a slotted crossbar through which the strapping strand passes, a lever pivoted within the respective side of the cap and movable in a plane parallel to the general plane of the cap between operative and inoperative positions and linkage between the lever and the slotted crossbar such that movement of the lever from inoperative position to operative position causes rotation of the slotted crossbar to wind the strapping strand round the slotted crossbar, thus enabling tension to be developed in the strapping strand after its hook has been engaged with a pallet, together with manually releasable spring-loaded latch means for securing the strapping strand in tension. Thus the lever is accessible from the respective side of the cap regardless of the height at which the cap is disposed on a load on a pallet.

The latch means may also hold the lever in inoperative position; alternatively, a return spring may be provided to urge the lever to inoperative position.

The axis of rotation of the slotted crossbar may be at the middle of the slot or offset therefrom. The slotted crossbar may be formed by a pair of parallel bars rigidly connected at both ends, and the axis of rotation may be at the middle of one of the bars, whereby the other bar orbits round it.

The extent of rotation of the slotted crossbar, and hence the tension in the strapping strand, may be determined by the mechanical advantage of the lever and the form of linkage between the lever and the slotted crossbar. Thus the linkage may comprise at least one wire or, preferably, wire rope for its strength, flexibility and durability, or substantially non-extensible non-metallic mono-filament or stranded cable (hereinafter referred to simply as "wire", but "wire rope" in the particular embodiment to be described with reference to the accompanying drawings) secured at one end to the lever and secured at the other end to a pulley secured for rotation with the slotted crossbar, movement of the lever from inoperative position to operative position effecting unwinding of the wire from the pulley to cause winding of the strapping strand round the slotted crossbar; the ratio of the diameter of the pulley to the crossbar thus affords a high mechanical advantage capable of developing high tension in the wire (and hence in the strapping strand after its hook has been engaged with a pallet); with a spring return for re-winding the wire onto the pulley when the lever is moved to effect release of tension in the wire. The wire (or cable) may be formed of metal or of any other substantially inelastic/non-extensible material.

A ratchet mechanism is preferably incorporated in the linkage between the lever and the slotted crossbar, to enable repeated swinging of the lever to-and-fro to effect as many turns of the strapping strand round the slotted crossbar as may be needed for adequate tensioning of the strapping strand and holding that tension.

The lever and ratchet mechanism may be based on a well-known type of device for tensioning a strap for securing a load on a lorry or a strap on a side sheet for protecting a load on a lorry, in which device the strap is wound round a spool between two arms of a bifurcated lever, a ratchet being provided between each end of the spool and the respective adjacent arm, the lever arms and spool and ratchets being mounted on a common pivot in a mounting frame, with the ratchets secured for rotation with the spool and the lever rotatable with respect to the spool and ratchets, a drive plate slidably mounted on the lever, a first spring urging the drive plate into engagement with the ratchet to enable to-and-fro swinging of the lever to wind the strap round the spool and tension it, a second spring urging the latching plate into engagement with the ratchet to latch the ratchet at times when it is not being rotated by driving action of the lever through the drive plate, the drive plate being manually operable against the first spring to disengage it from the ratchet, and a cam on the lever for disengaging the latching plate from the ratchet after the drive plate has encountered and rides along a radius plate fixed in the mounting to hold the drive plate clear of the ratchet when unwinding of the strap from the spool is required.

Such a device is usually wholly or principally of metal construction, with coil compression springs for the drive plate and the latching plate and could be adapted for incorporation in a cap as described above by, instead of the strap being wound on the spool, a circumferential groove is provided in the spool in which is reeved and wound one end of the wire (or cable) the other end of which is secured to the pulley for effecting rotation of the slotted crossbar on to which the strapping strand is wound.

However, the lever and ratchet mechanism is preferably formed wholly or principally with parts molded in plastics material, with resulting potential for reducing costs and weight and also member of components.

Therefore, there is preferably provided a bifurcated lever, a spool with a ratchet extending from one end to a circumferential groove adjacent the other end into which the wire (or cable) is reeved, the lever and the spool being rotatable about a fixed common axis in the housing and the lever being rotatable with respect to the spool, a ratchet drive pawl on a first resilient arm mounted in the lever, a latching pawl on a second resilient arm mounted in the housing to latch the ratchet at times when it is not being rotated by the driving action of the lever through the drive pawl, a fixed stop in the housing for limiting swinging of the lever (for example to 90°) from inoperative position, manually operable means for disengaging the drive pawl from the ratchet, and a cam on the lever for disengaging the latching pawl from the ratchet after the drive pawl has encountered and rides along a fixed radius plate in the housing beyond the stop means.

A spring is preferably provided to return the lever to inoperative position automatically, which spring is conveniently a torsion spring coiled about the lever and spool pivot and with end arms abutting projections on the lever and within the housing respectively; thus this spring is, along with the wire reeved to the spool in the circumferential groove, one of the only two metal parts required in the lever and ratchet mechanism.

The manually operable means for disengaging the drive pawl from the ratchet may comprise a slider movable in the lever towards and away from the drive pawl, with a head on a neck passing through a slot in the first resilient arm, the head having lateral projections engaging ramps on each side of the slot when the slider is moved towards the drive pawl; there preferably also being a fixed abutment in the housing spaced from the fixed stop to be engaged by the slider to urge it back towards its inoperative position as the drive pawl rides along the radius plate.

It is preferable to ensure that the latching pawl cannot be unintentionally disengaged from the ratchet (e.g. through vibration during transporting of a capped load on a pallet) and this may be effected by providing a plate or spaced abutments on the lever to lie alongside the second resilient arm when the lever is moved into inoperative position.

Torque limiting means may be incorporated in the lever to ensure that the wire (or cable) cannot be overloaded.

Each strapping strand is preferably a strap having its end remote from the hook secured to the barrel of a drum, with a spring within the drum for retracting the strap when it is free to run through the slotted crossbar. The drum may be on an axis perpendicular to the general plane of the cap, in which case the strap twists through 90.degree. between the drum and the slotted crossbar. Thus each housing need have a depth little more than the height of the drum, which preferably has thin flanges at the ends of its barrel.

Each hook preferably has two prongs spaced apart so as to fit one to each side of a middle spacer of a pallet.

Each opening is preferably provided at the back of a recess in the respective side of the cap of a depth front-to-back to receive fully the respective hook, and the bottom of the recess provided with ramping surfaces to effect automatic parking of the hook into the recess upon retraction of the strap into the housing and retention of the hook against dislodgement if the cap is turned over; and the lever is located within a slot in the respective side of the cap extending from the recess.

To suit different widths of middle spacers in pallets, e.g., standard wooden pallets, euro pallets and specific user pallets, hooks of different sizes may be made available with different spacings between the prongs, for location closely to each side of the respective width spacer, each prong being cranked out from a mid-portion of the hook of a width commensurate with the width of the strap secured around it. Alternatively, a single size of hook may be provided with a spacing between the prongs for location closely to each side of the widest middle spacer in use. Each hook is preferably provided with a bracing bar parallel to the mid-portion to aid placement onto a pallet by the toe of footwear of a user. The bracing bar may be pulled by the fingers of a user for effecting withdrawal of the hook from its recess; alternatively, the strap may extend beyond the bracing bar for grasping by a user's hand, or the strap may terminate at the mid-portion of the hook and a separate tab provided on the bracing bar.

The bulk of the cap is conveniently formed of plastics material, with a main mauling forming a lower portion, upstanding sides and depending skirt, one or more molding forming an upper portion, and with integral wall formations on the upperside of the lower portion defining the housings, and providing axles for the drums and guides for the straps from the drums to the slotted crossbars. The skirt is preferably stepped outwardly from side portions of the cap to enable like caps to be nested with each other and/or with pallets during return transporting as well as to help secure a load on a pallet by embracing the top sides of the load.

The underside of the cap is preferably slightly domed, i.e. it is slightly lower (e.g. by 6.0 mm) at the corners than at the center, or is provided with pads (e.g. 120.0 mm square and 6.0 mm thick) adjacent the corners, so that with strapping strands at the middle of sides of the cap under tension tending to cause bowing, the doming or pads will distribute the loading of the cap more evenly across the top of the load on the pallet to which the cap is applied and the straps are hooked respectively.

Each set of lever, spool, slotted crossbar, etc. together with recess and ramping surfaces may be provided in a cassette having a chassis and a cover, with upstanding formations on the chassis and depending formations on the cover mating to form bearings for the slotted crossbar and pulley.

The center of the upper portion of the cap may be provided with an opening spanned by a bar handle, to facilitate manual handling of the cap by one hand of an operator, particularly onto and off loads on pallets, the central opening preferably being located above a continuous wall upstanding from the lower portion, to prevent water or dirt entering the space between the molding occupied by the strapping mechanisms; alternatively, or in addition, one or more handholds may be provided at each side of the cap, or on top adjacent each corner, to allow the other hand of an operator to steady or control manipulative movement of the cap, e.g. a slot in each side of the skirt; or the skirt round all sides of the cap may suffice as a handhold anywhere convenient.

While a cap with two strapping strands may suffice for use with a 2-way pallet or a 4-way pallet, a cap according to the present invention may have four strapping strands especially for use with a 4-way pallet but capable of being used with a 2-way pallet by utilizing only two opposite strapping strands or all four.

BRIEF DESCRIPTION OF THE DRAWINGS

An embodiment of the invention and a modification thereof will now be described, by way of example only, with reference to the accompanying drawings in which:

FIG. 17 is a view from the front and above of a lever seen in FIGS. 1 to 3 and FIGS. 9 and 10;

FIG. 18 is an underneath view of the lever;

FIG. 19 is a view from the front and below of the release slider seen in previous views of the lever;

FIG. 20 is the opposite view of the release slider;

DETAILED DESCRIPTION OF EMBODIMENTS OF THE INVENTION

Figure 1:
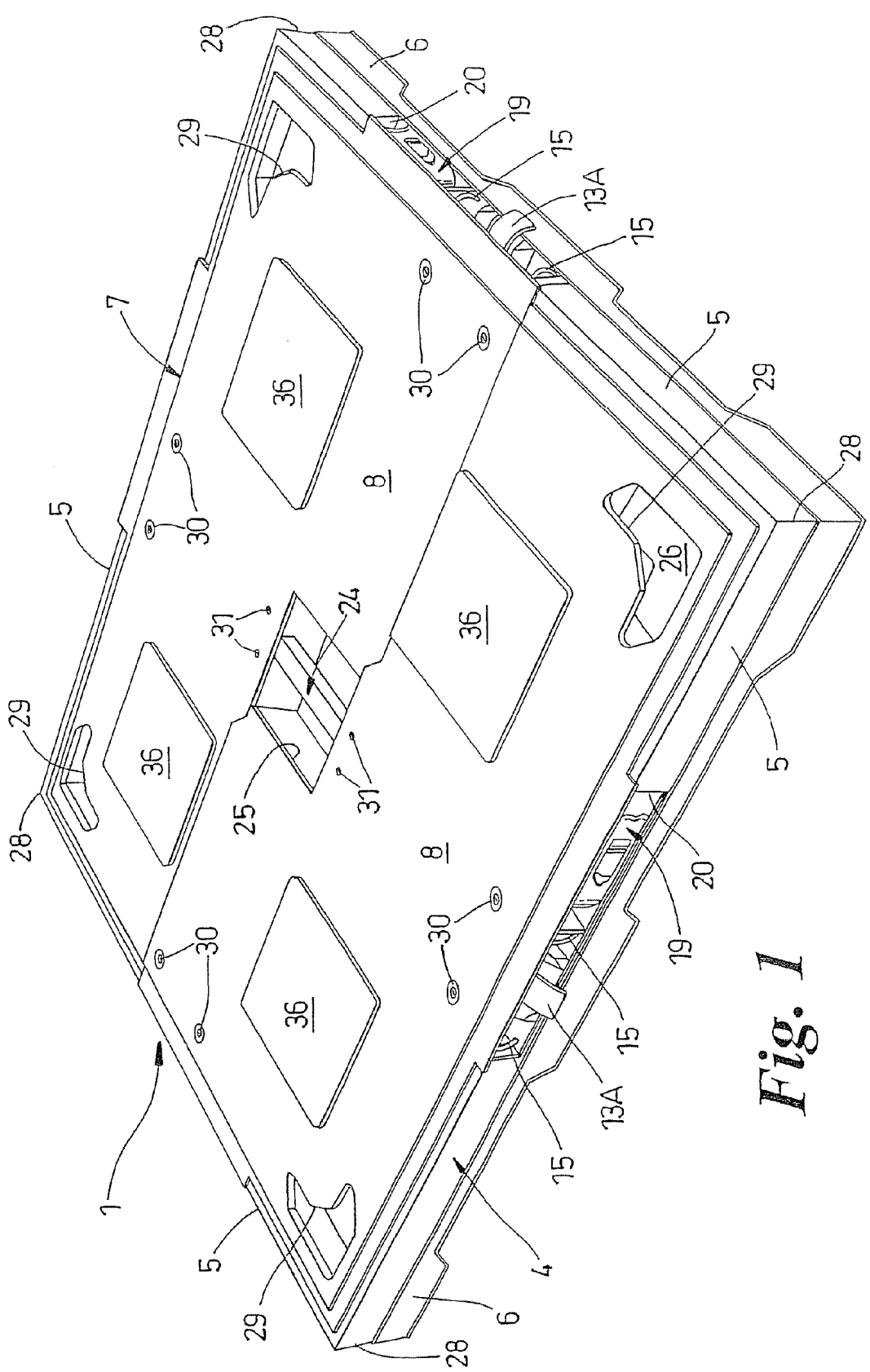
FIG. 1 is a view from above of a cap in accordance with the invention.
Figure 2:
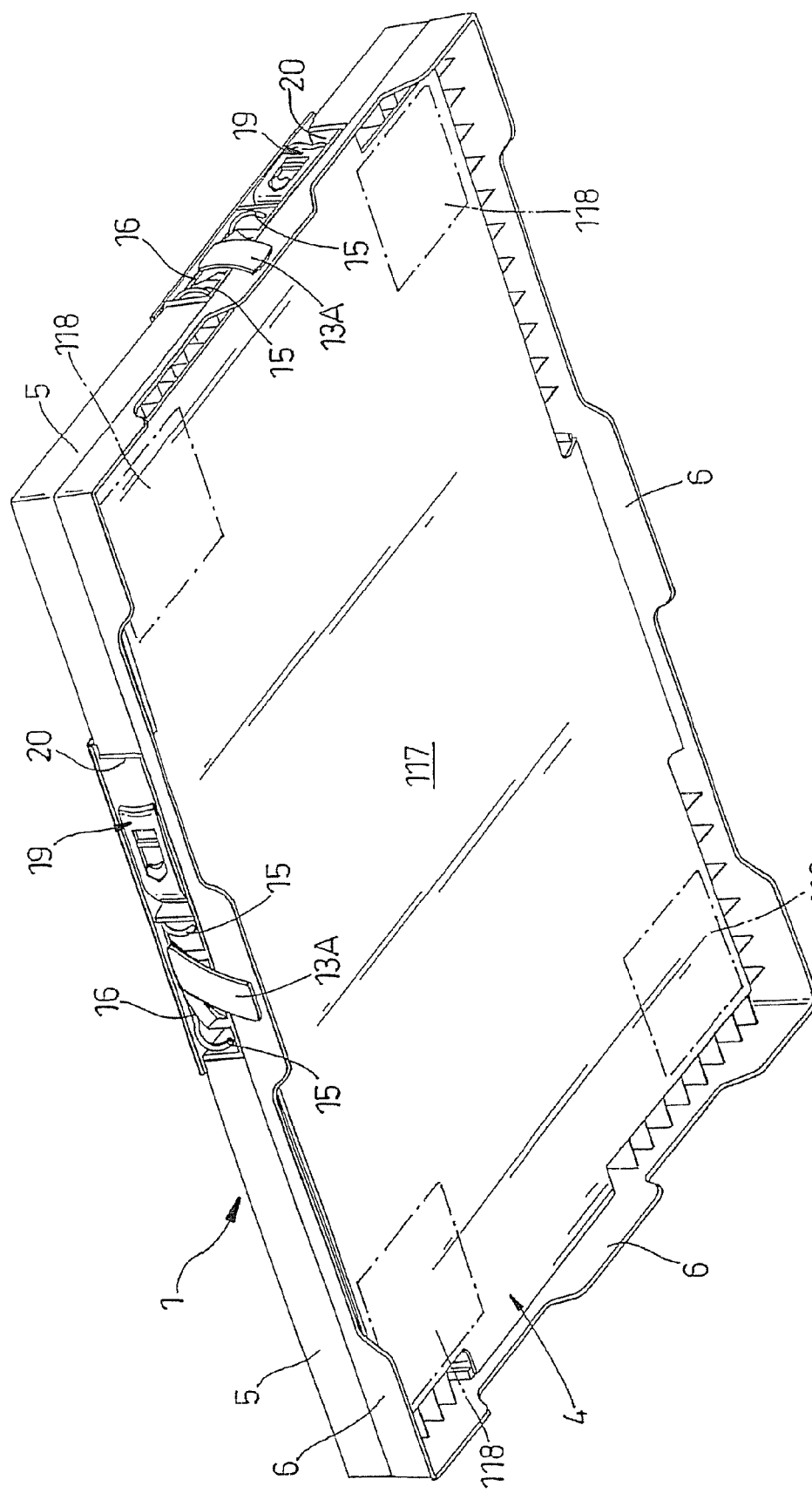
FIG. 2 is an underneath view of the cap of FIG. 1.
Figure 3:
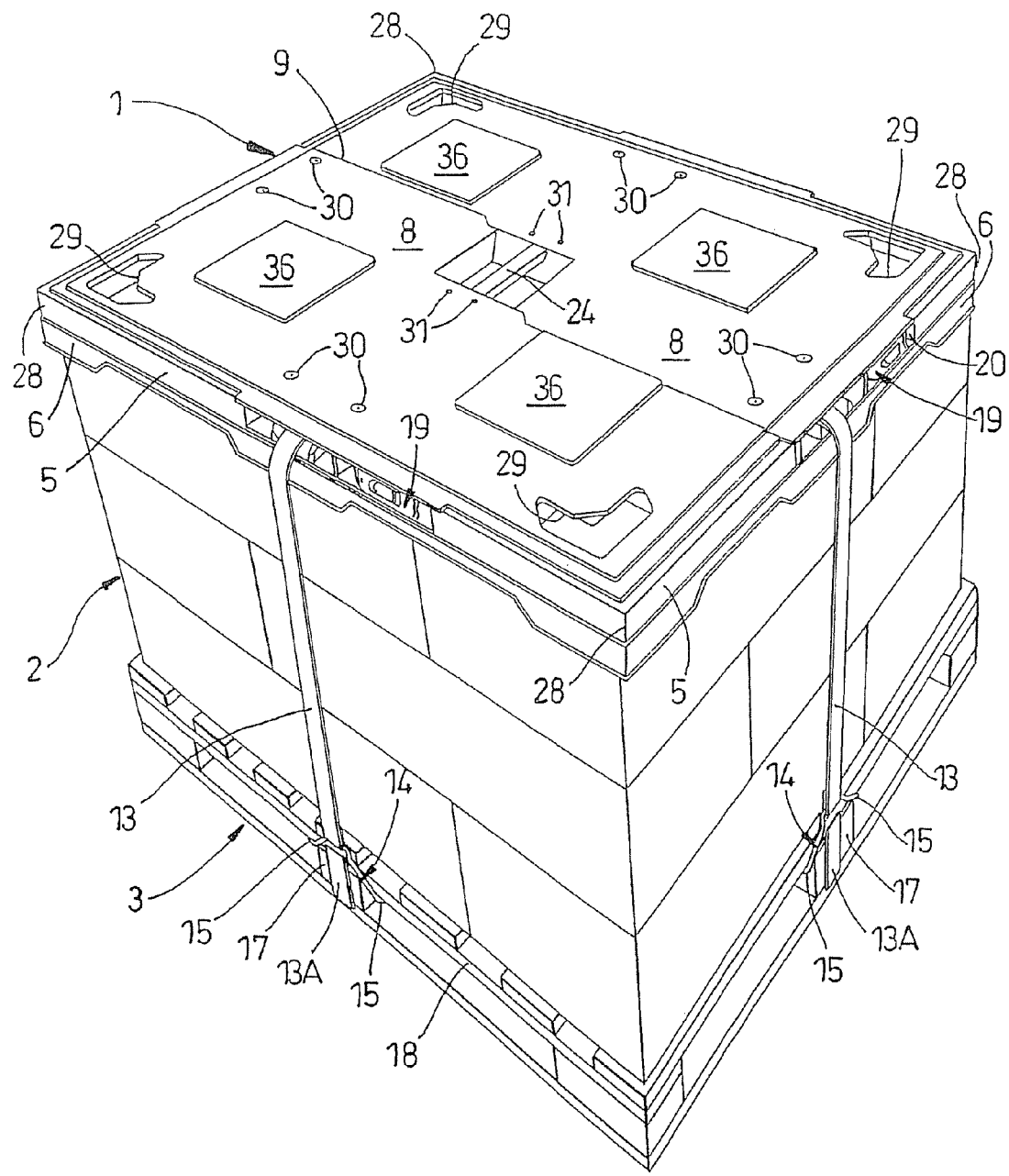
FIG. 3 shows the cap of FIGS. 1 and 2 in use securing a load on a pallet.
Figure 5:
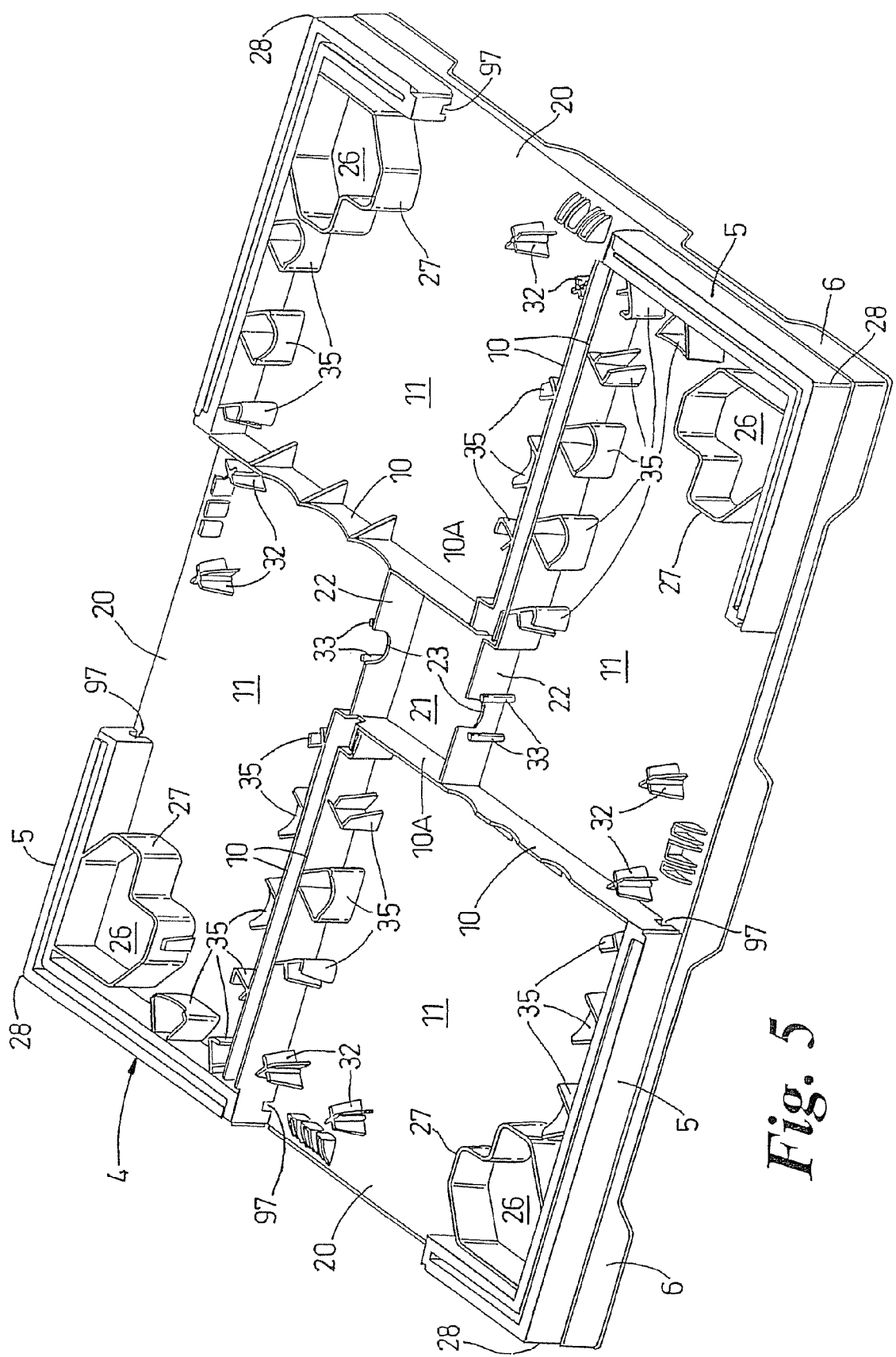
FIG. 5 is a view from above of the main mauling forming the lower portion of the cap.
Figure 6:
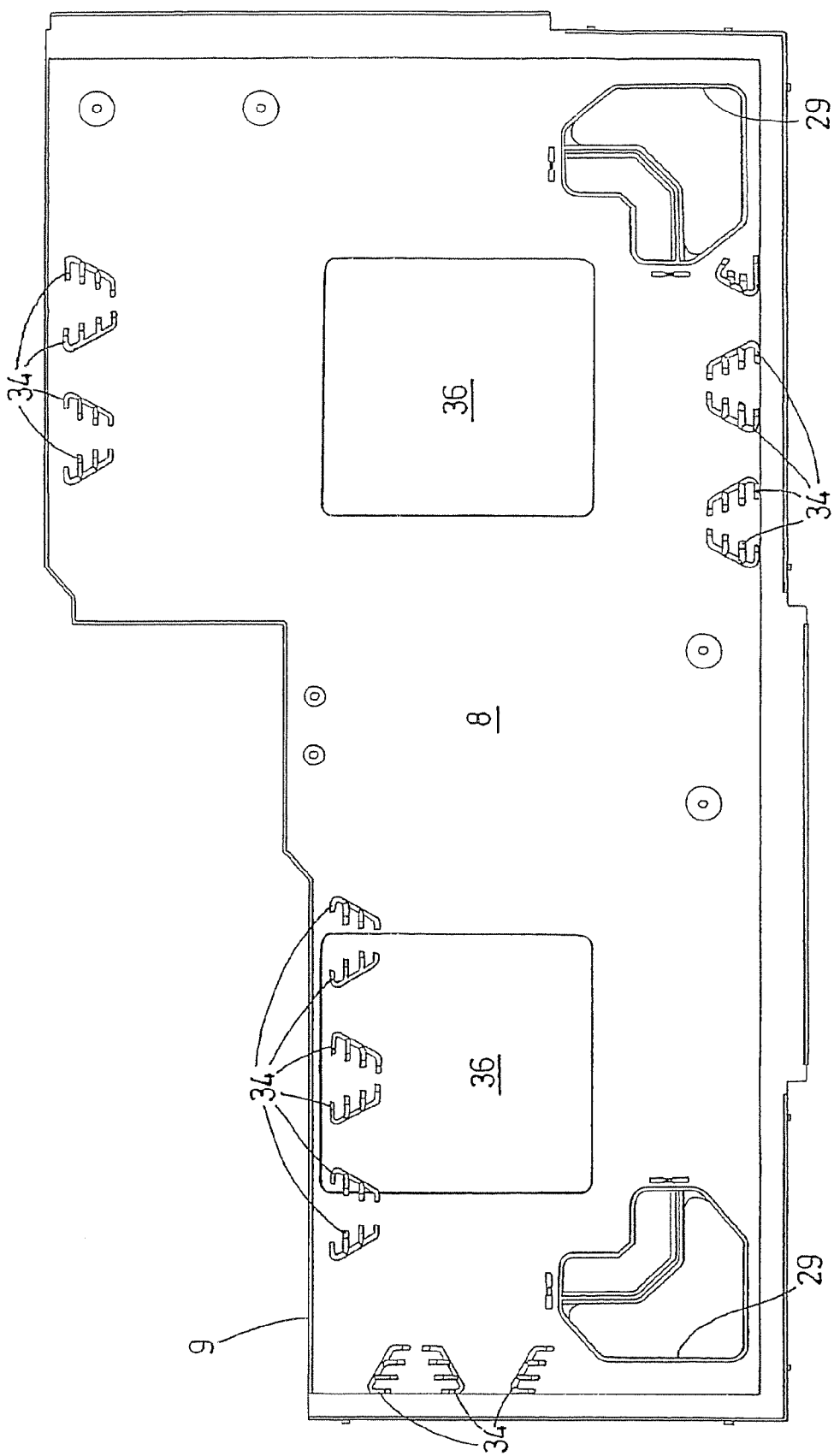
FIG. 6 is an underneath view of one of the two moldings forming the upper portion of the cap.

The cap 1 shown in FIGS. 1 and 2 is for use in securing palletized loads, such a load 2 being shown in FIG. 3 secured on a pallet 3 by the cap, which has a lower portion 4 with upstanding sides 5 and depending skirt 6 (for embracing the top sides of the load) (and also enabling caps to be nested with each other or with pallets) formed by a main plastics mauling (see also FIG. 5) and an upper portion 7 shown formed by two plastics molding 8 (see also FIG. 6), but which could be formed as a single mauling, in which case there would not be mating edges at the lines 9.

Figure 4:
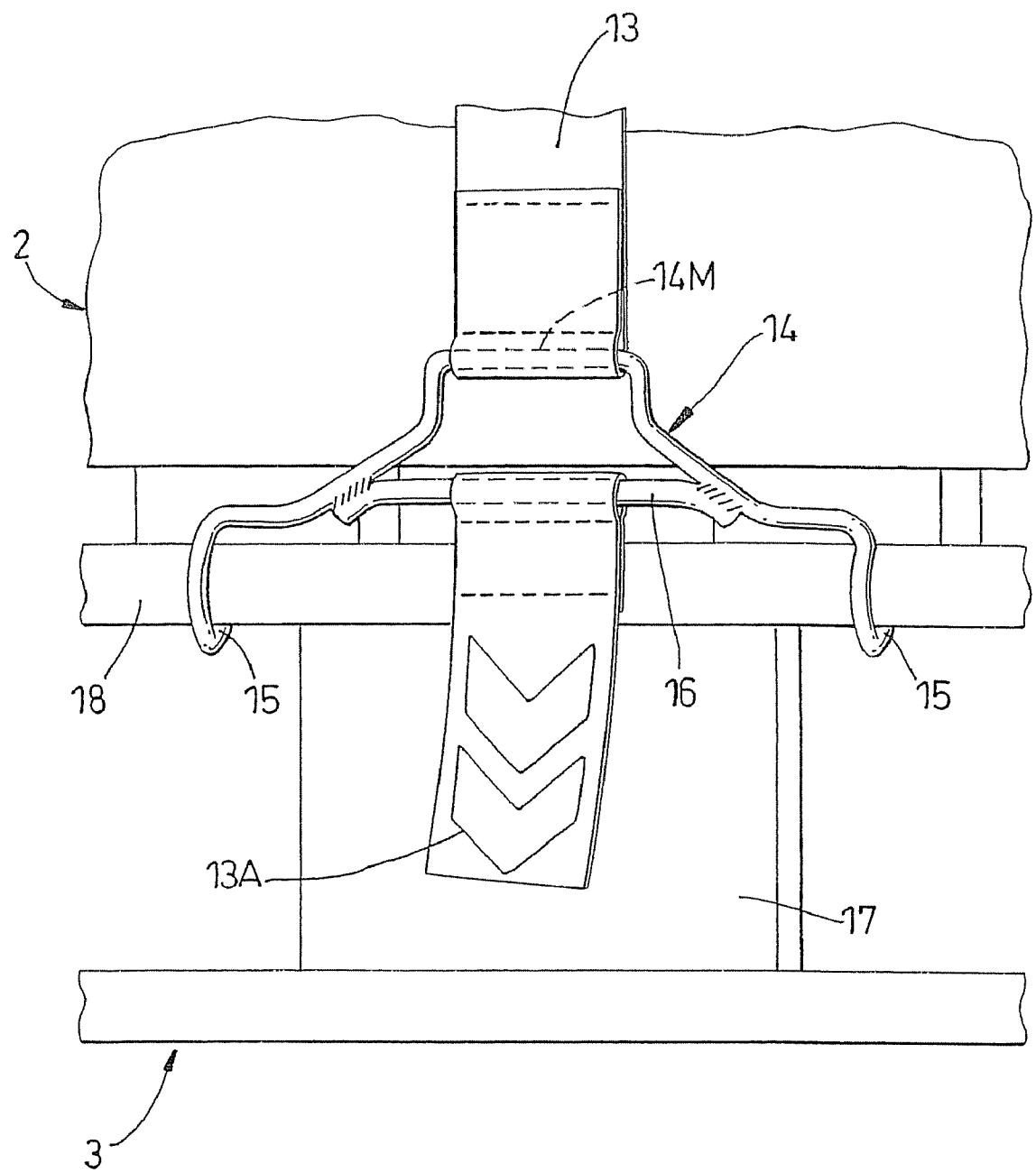
FIG. 4 is a fragmentary view showing in more detail one of the hooks seen in FIG. 3 engaged with the platform of the pallet.

Integral wall formations 10 on the upperside of the lower portion 4 of the cap define housings 11 for cassettes 12 (see FIGS. 9 to 12) containing retractable straps 13 on free ends of which are hooks 14 (see also FIG. 4) each having two prongs 15 spaced apart so as to fit one to each side of a middle spacer 17 of a pallet (see particularly FIG. 4) with the prongs engaging the underside of the platform 18 of the pallet, so that the straps 13 can be tensioned by mechanisms within the cassettes (to be described in detail presently) upon operation of levers 19 which can be seen, along with the retracted hooks 14, in FIGS. 1 and 2 in gaps 20 in the sides 5 of the lower portion/main mauling 4.

The hook 14 is provided with a bracing bar 16 parallel to a mid-portion 14M of the hook to which the strap is secured, to aid placement on to a pallet by the toe of footwear of a user, and a tab 13A formed by a portion of strap is secured to the bracing bar to extend beyond the side 5 of the cap 1 for grasping by a user's hand, for withdrawal of the hook and strap from the cap.

FIGS. 1 to 3 indicate the inclusion of straps 13 and levers 19 (in cassettes 12) on all four sides 5, but two straps, etc., on opposite sides may suffice, in which case the gaps 20 in the other two opposite sides can be closed by blanking-off strips, not shown.

Figure 7:
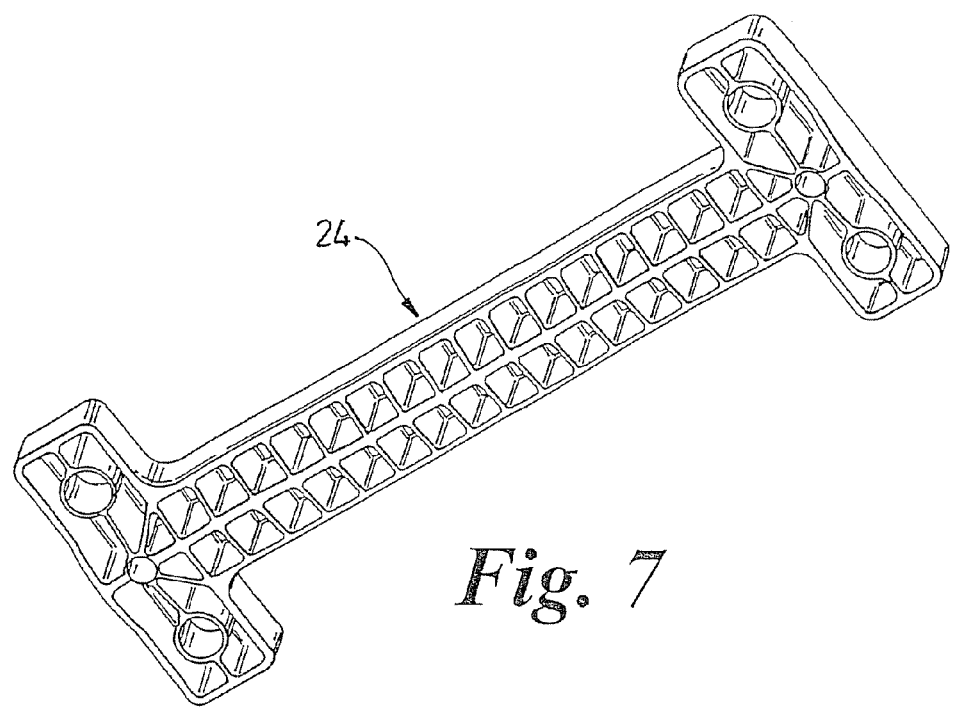
FIG. 7 is a view from below of the handle member seen in FIGS. 1 and 3 secured between the molding forming the lower and upper portions of the cap.
Figure 8:
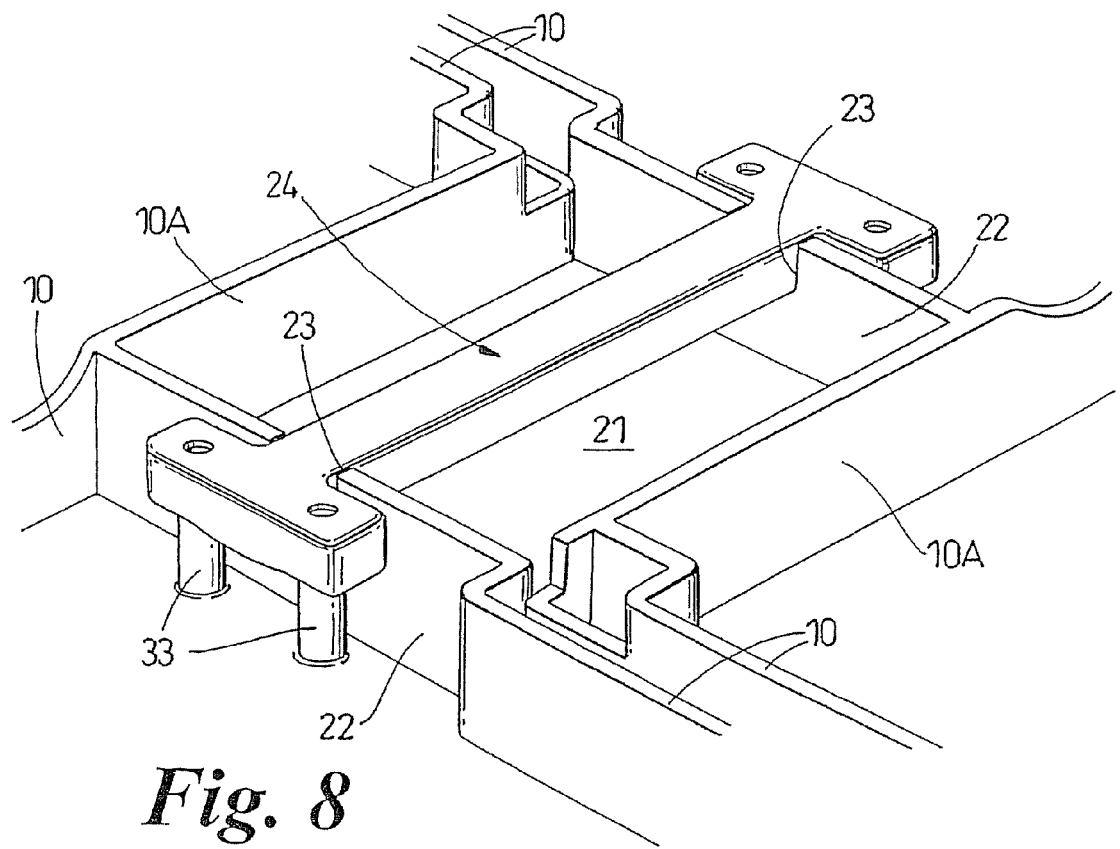
FIG. 8 is a fragmentary view showing the handle member in place in the main mauling.

A central pocket 21 (see FIG. 5) is formed in the main mauling 4 by two upstanding wall formations 22 between portions 10A of the wall formations 10, and notches 23 are provided in the wall formations 22 to receive an I-shaped handle 24 (see also FIGS. 7 and 8) which is accessible through an opening 25 formed between the molding 8. Further pockets 26 are formed by further upstanding wall formations 27 near the corners 28 of the main mauling 4 to register with openings 29 in the molding 8 to provide additional handholds for steadying the cap 1 when being placed on or lifted off a load by a hand grasping the handle 24.

The molding 8 are secured by screws 30, 31 into pairs of pillars 32, 33 respectively within the housings 11 in the mauling 4, and the pairs of pillars 32 also serve to locate the cassettes 12, as will be described presently. Depending formations 34 on the underside of the molding 8 interdigitate with further upstanding formations 35 within the housings 11 to stiffen the assembled cap. Raised areas 36 are provided on the molding 8 for location within the base of another pallet (not shown) placed on the cap.

Figure 9:
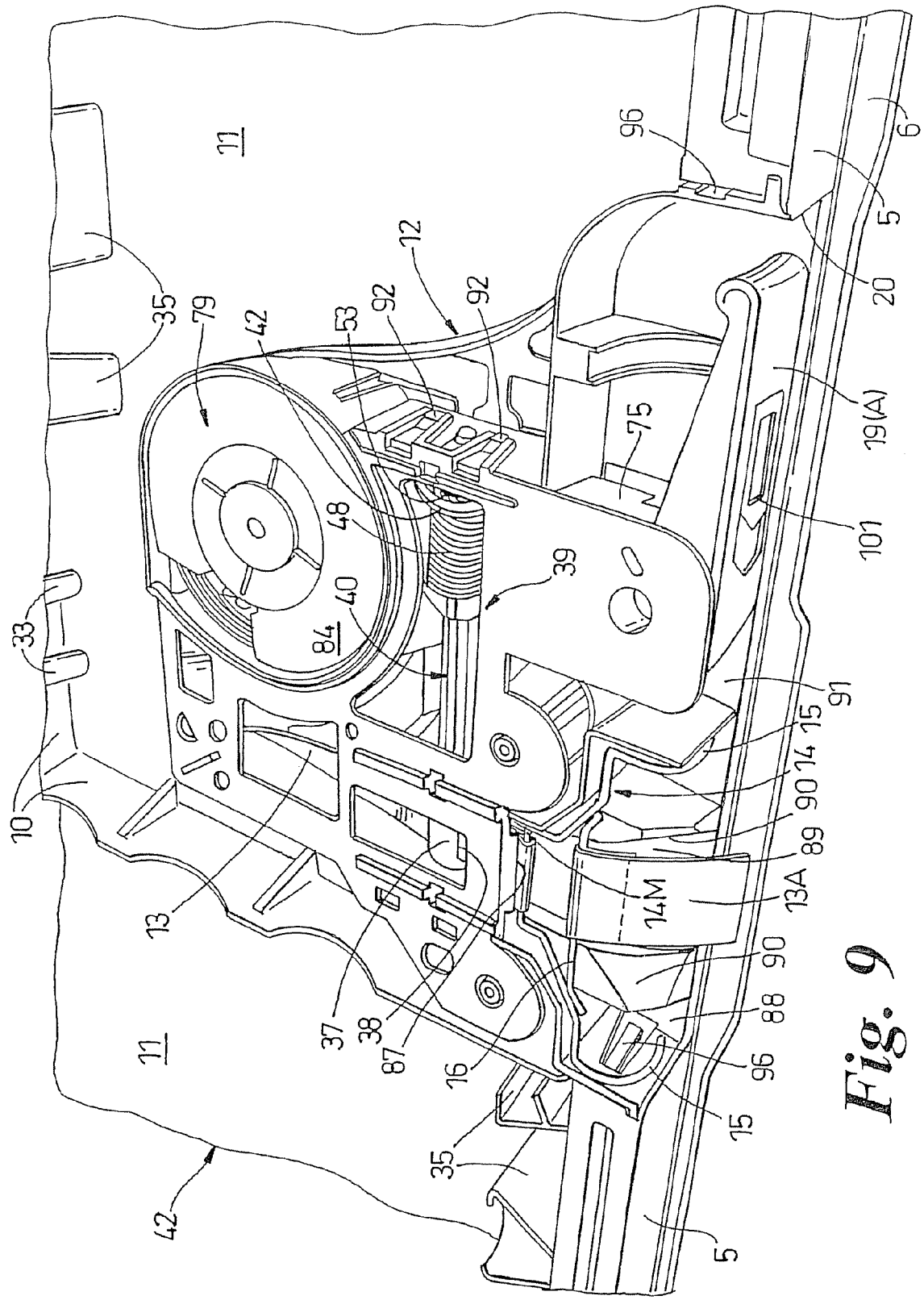
FIG. 9 is a view from above of a form of cassette fitting into two (or more) opposite housings in the main mauling seen in FIG. 5.
Figure 10:
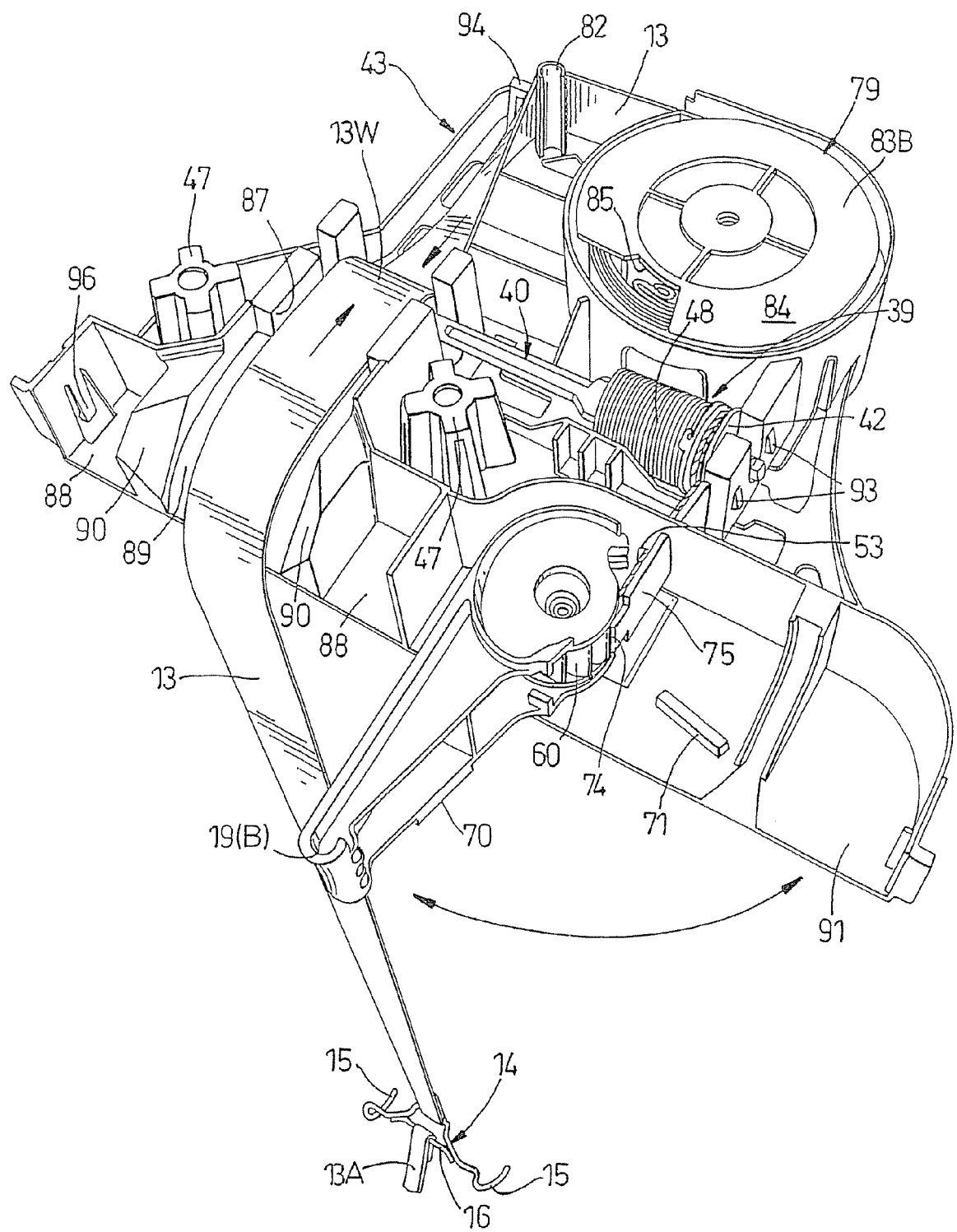
FIG. 10 corresponds to FIG. 9 but with the cover of the cassette removed and the mechanism in operative condition.
Figure 11:
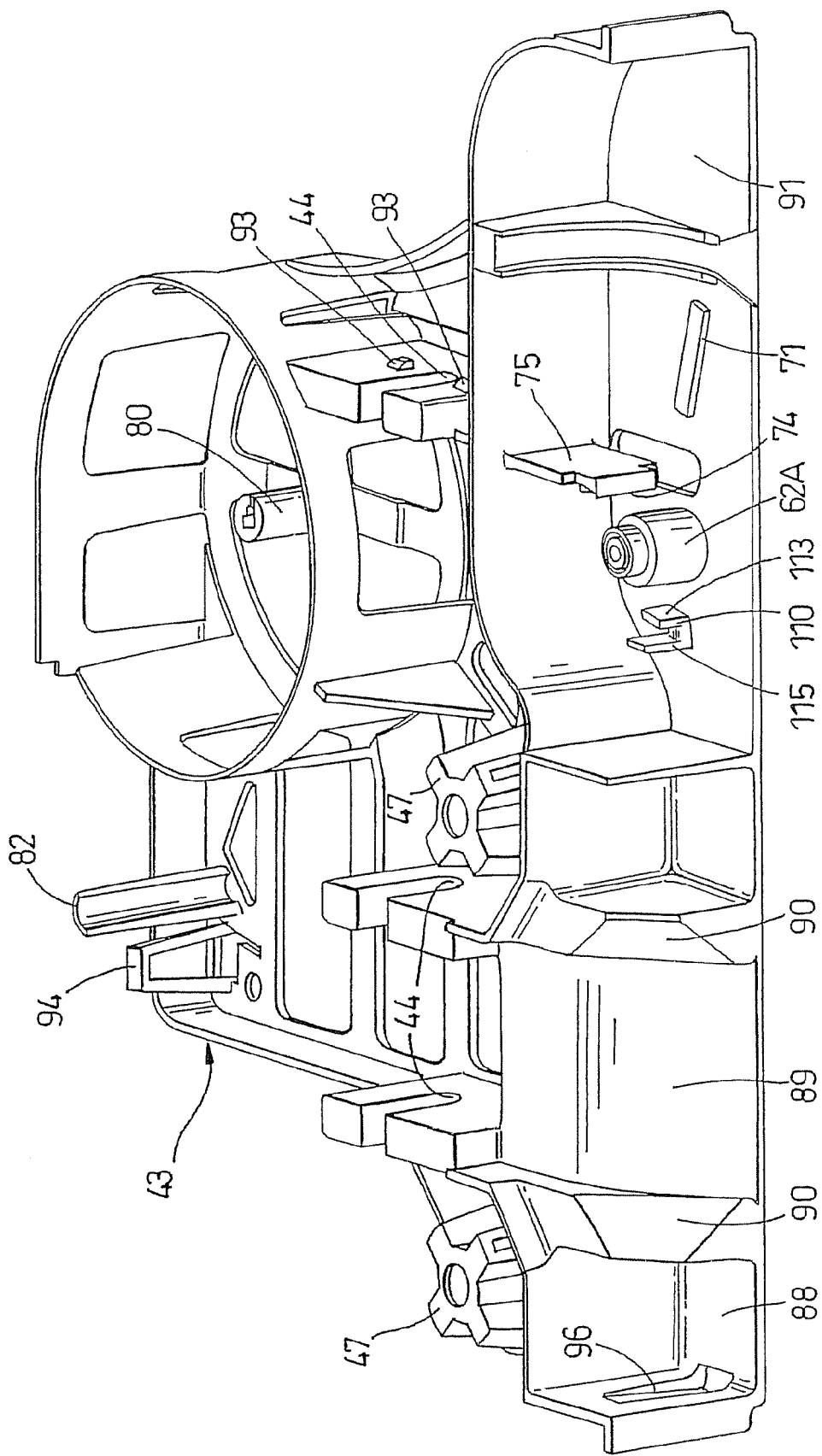
FIG. 11 is a view from above of the chassis of the cassette of FIGS. 9 and 10.
Figure 12:
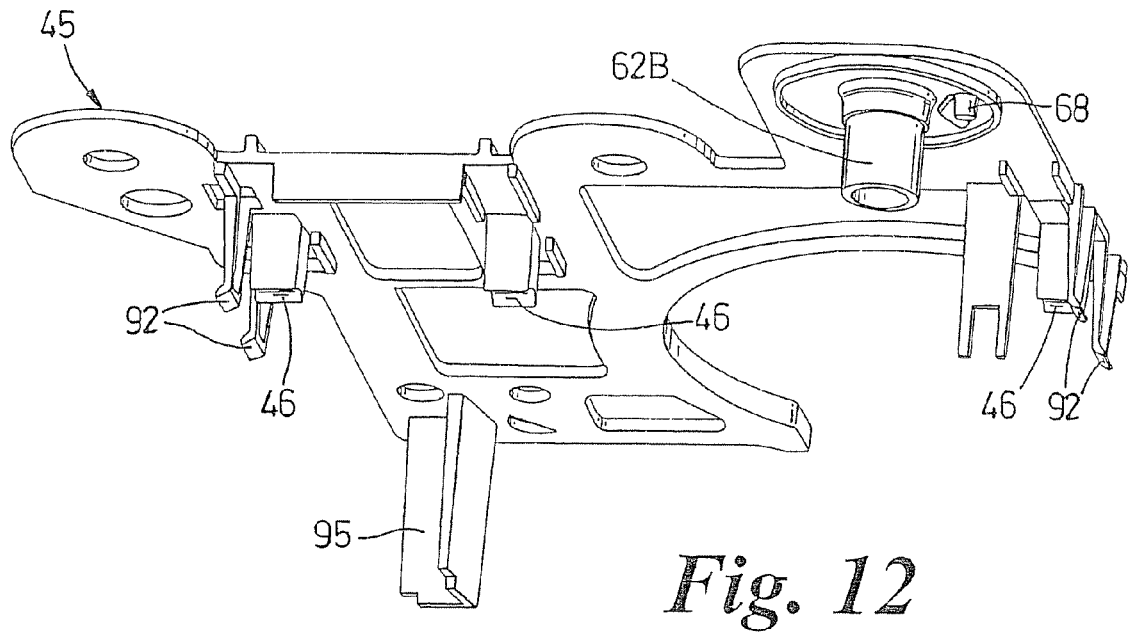
FIG. 12 is an underneath view of the cover of the cassette.
Figure 15:
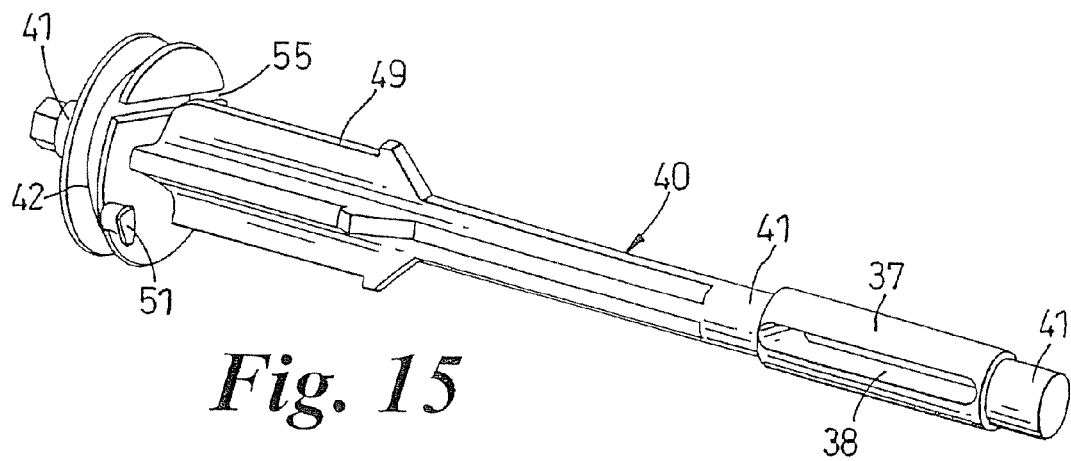
FIG. 15 is a view of the spindle seen in FIGS. 9 and 10 as viewed in an opposite direction.

Tensioning means for each strap 13 comprises a crossbar 37 (see FIGS. 9 and 15) with a slot 38 through which the strap 13 passes, and linkage 39 to the lever 19 whereby movement of the lever from inoperative position 19(A) (FIGS. 9 and 27) to operative position 19(B) (FIGS. 10 and 28) causes rotation of the slotted crossbar, to effect winding of the strap round the crossbar, as is evident at 13W in FIG. 10, thus enabling tension to be developed in the strap after the prongs 15 of its hook 14 have been engaged with a pallet.

The linkage 39 will now be described in detail.

Figure 16:
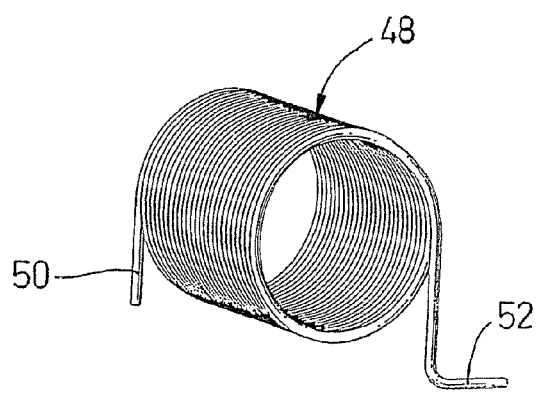
FIG. 16 is a view of a rewind spring for the spindle.
Figure 13:
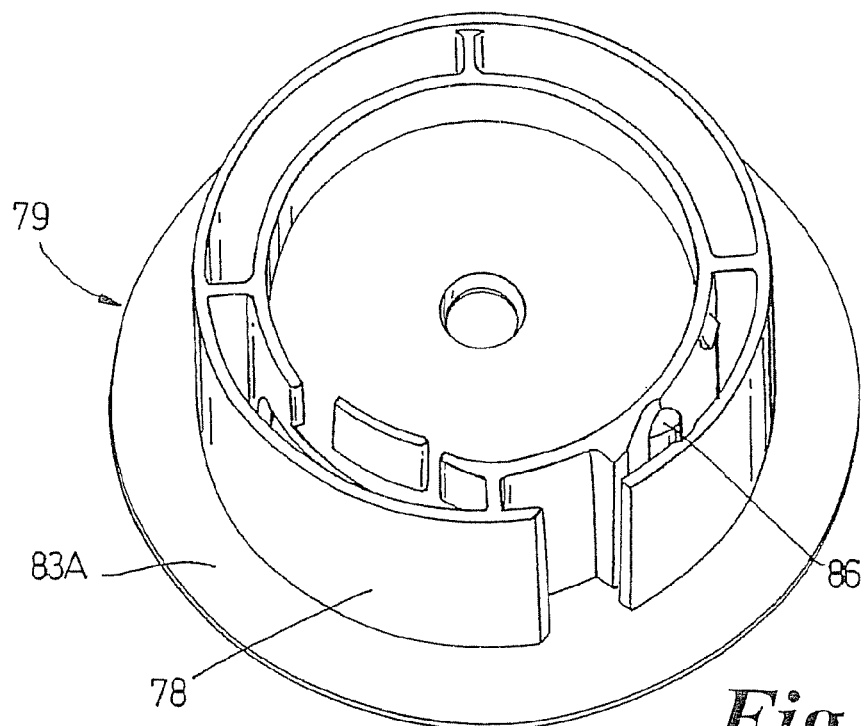
FIG. 13 is a view from above of the drum seen in FIGS. 9 and 10.
Figure 14:
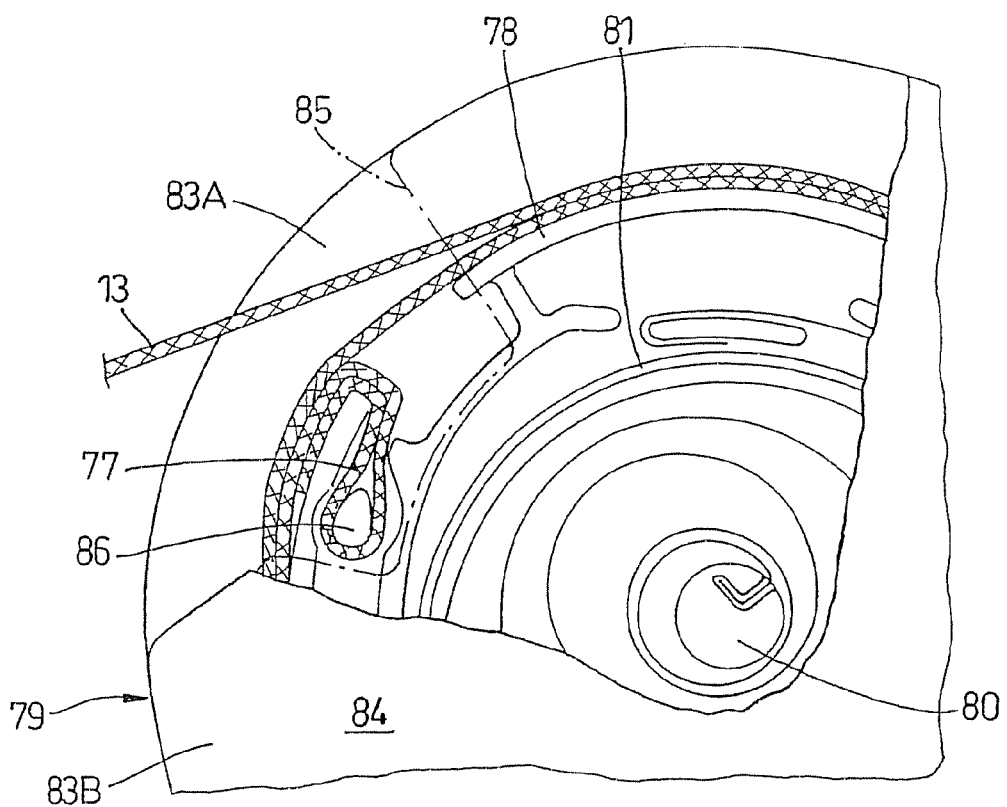
FIG. 14 is a fragmentary view showing part of the drum with a portion of its cover broken away to show a strap attached thereto and partially wound thereon, and also showing a rewind spring for the drum.
Figure 21:
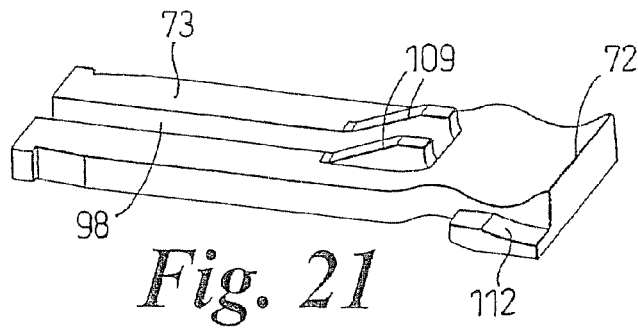
FIG. 21 is a view from the rear and below of a driving pawl for incorporation in the lever.

The slotted crossbar 37 is provided at one end of a spindle 40 having journals 41, one adjacent each end of the slot 38 and a third at the other end of the spindle, adjacent a pulley 42. A chassis 43 of each cassette 12 (see particularly FIG. 11) is provided with upstanding half-bearings 44 for the journals 41 and a cover 45 of the cassette (see particularly FIG. 12) has the other halves 46 of the bearings depending therefrom. The chassis 43 has hollow upstanding formations 47 for location on the pillars 32 on the main molding 4 of the cap 1. A coil spring 48 (FIGS. 9, 10 and 16) encircles a ribbed portion 49 (FIG. 15) of the spindle and has a limb 50 at one end to engage a small hook-like projection 51 on the pulley, while a bent limb 52 on the other end engages a recess (not visible) in the base of chassis, the spring 48 being effective to urge the slotted crossbar 37 to the position shown in FIG. 9 when tension in the strap 13 is to be released.

Figure 26:
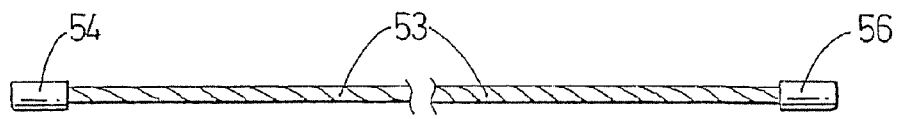
FIG. 26 is a view of a cable with ferrules for attachment to the spindle and spool respectively.
Figure 24:
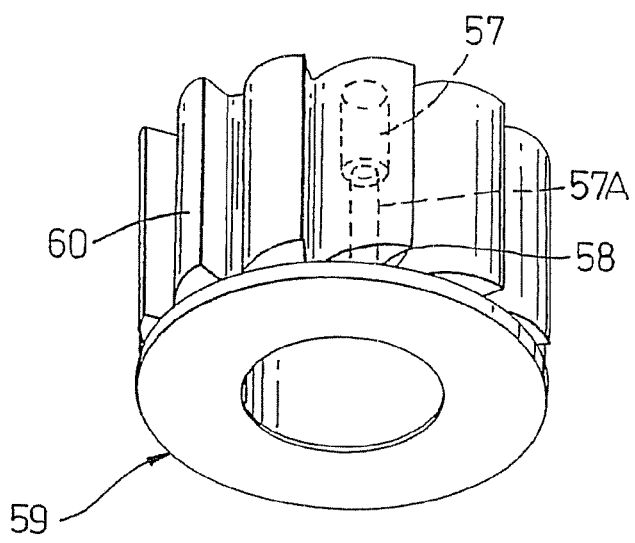
FIG. 24 is a view from below of a spool with a ratchet for incorporation in the lever.
Figure 25:
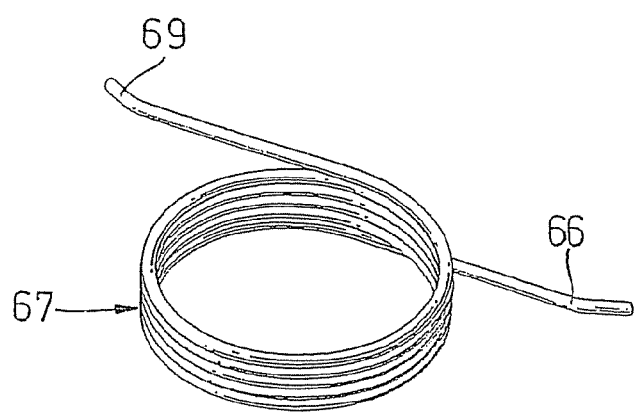
FIG. 25 is a view of a return spring for the lever.

A wire rope 53 (FIGS. 10 and 26) has a ferrule 54 at one end for engagement in a socket 55 in the pulley 42, and the wire rope has a number of turns wound on the pulley (as indicated in FIGS. 9 and 10), while the other end of the wire rope is provided with a ferrule 56 for engagement in a counterbore 57 in a bore 57A opening into a groove 58 adjacent one end of a spool 59 (see FIG. 24) having a ratchet 60 extending from the other end to the groove. The spool is rotatable along with and with respect to the lever 19 on a fixed common axis 61 provided by pivot portions 62A, 62B on the chassis 43 and the cover 45 respectively, the lever being bifurcated to provide upper and lower flanks 63, 64 respectively (see particularly FIGS. 17, 18, 22 and 23) between which the spool 59 is disposed. The upper flank 63 of the lever 19 has a projection 65 for engagement by a limb 66 at one end of a coil spring 67 (see FIG. 25), while the underside of the cover 45 of the cassette has a projection 68 for engagement by a limb 69 at the other end of the spring 67, the spring thereby being effective to urge the lever 19 towards inoperative position, in which position a bar 70 on the underside of the lever 19 abuts a bar 71 on the base of the chassis 43.

The lever 19 contains a drive pawl 72 (see FIGS. 21 to 23 and 27 to 30) for the ratchet 60 on a first resilient arm 73, while the chassis 43 carries a latching pawl 74 (see also FIGS. 10 and 11) on a second resilient arm 75 so that when the lever 19 is oscillated between the positions shown in FIGS. 9 and 10 (or FIGS. 27 and 28) the drive pawl rotates the ratchet/spool 59 to wind the wire rope 53 into the groove 58 in the spool, thus winding the wire rope from the pulley 42 and, therefore, rotating the spindle 40 to wind the strap 13 on to the slotted crossbar 37 (as seen at 13W in FIG. 10), and the latching pawl 74 holds the ratchet/spool while the lever 19 returns, under the urge of the spring 67 to the position shown in FIG. 9. The lever 19 has two spaced abutment portions 76 to lie alongside the second resilient arm 75 when the lever is moved into the position shown in FIG. 9, to ensure that the latching pawl 74 cannot be unintentionally disengaged from the ratchet 60 through vibration during transporting of a capped load on a pallet Further details of the lever 19 and their purpose will be described later with particular reference to FIGS. 27 to 30 in addition to FIGS. 17 to 23.

Each strap 13 has its end 77 remote from the hook 14 secured to the barrel 78 of a drum 79 (see FIGS. 9 to 11, 13 and 14) on an axis 80 perpendicular to the general plane of the cap 1, with a clock spring 81 within the drum for retracting the strap when it is free to run through the slotted crossbar 37, i.e., when in the position shown in FIG. 9, and the strap twists through 90.degree. between the drum and the slotted crossbar after turning round a guide post 82. Thus each housing 11 has a depth little more than the height of the drum 79, which has thin flanges 83A, 83B, the former being formed integrally with the drum while the latter is formed by a peripheral margin of a cover 84 with a snap-fitting (not visible) to the barrel of the drum, a cut-out 85 being formed in the cover for insertion or removal of the strap end 77 to or from an anchor post 86 within the barrel 78.

From the slotted crossbar 37 the strap 13 passes through an opening 87 provided at the back of a recess 88 of a depth front-to-back in the side 5 of the cap 1 to fully receive the respective hook 14, and the bottom of the recess is provided with ramping surfaces 89, 90 to effect automatic parking of the hook into the recess upon retraction of the strap into the housing and retention of the hook against dislodgement if the cap 1 is turned over, and the lever 19 is located, when in inoperative position, within a slot 91 in the respective side 5 of the cap extending from the recess. It will be evident that the recess 88 constitutes stop means for limiting retraction of the hook 14 into the housing 11 when not engaged with a pallet.

Depending V-shaped spring fingers 92 (see FIGS. 9 and 12) on the cover 45 of the cassette 12 make snap engagement with projections 93 on the chassis 43 and an inverted V-shaped spring finger 94 upstanding from the chassis 43 makes snap engagement with a projection that is not visible being on the far side of an L-shaped post 95 (FIG. 12) depending from the cover, to secure the cover on the chassis after the lever and ratchet mechanism etc has been inserted. Spring fingers 96 on the chassis 43 make snap engagement with notches 97 in the walls 10 of the main mauling 4 of the cap 1 at the ends of the gaps 20 (see particularly FIG. 5).

Turning now to FIGS. 17 to 23, the first resilient arm 73 carrying the drive pawl 72 is divided by a long slot 98 and the divided ends 99 are a snap-fit into a block 100 formed integrally within the lever 19, but only after insertion of a slider 101 through an aperture 102 in the outer face 103 of the lever, the slider having an angled corner 104 matching one side 105 of a V-shaped end to the aperture 102 to facilitate insertion of the slider. The slider is provided with a head 106 on a neck 107 passing through the slot 98 in the arm 73, the divided ends 99 of the arm 73 being inserted either side of the neck on the already inserted slider and then into the block 100. The head 106 has lateral projections 108 engaging ramps 109 on each side of the slot 98 when the slider is moved towards the drive pawl 72 to disengage the drive pawl from the ratchet 60.

Figure 22:
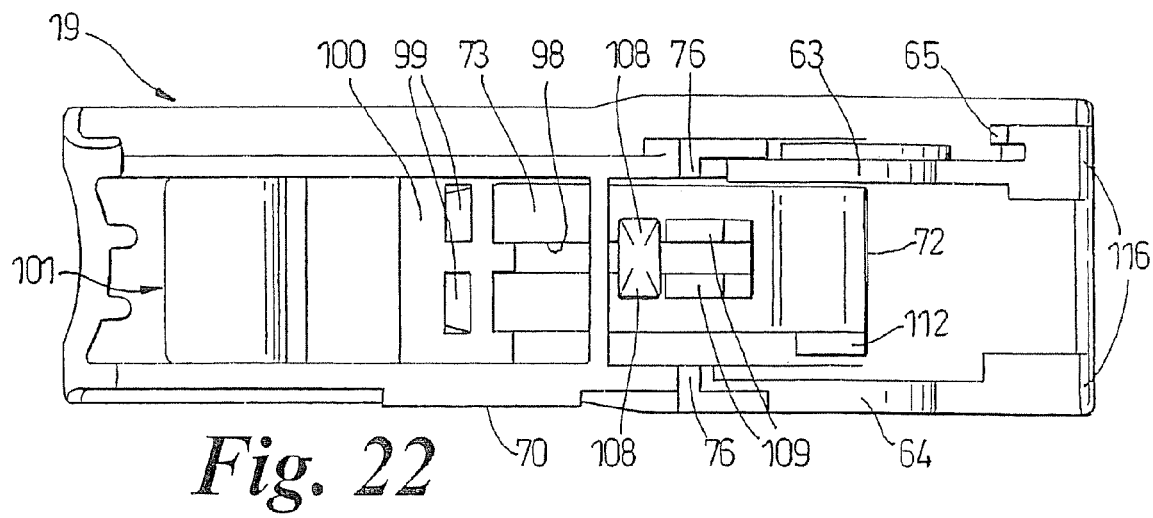
FIG. 22 is a view from the rear of the lever with the release slider and driving pawl incorporated.
Figure 28:
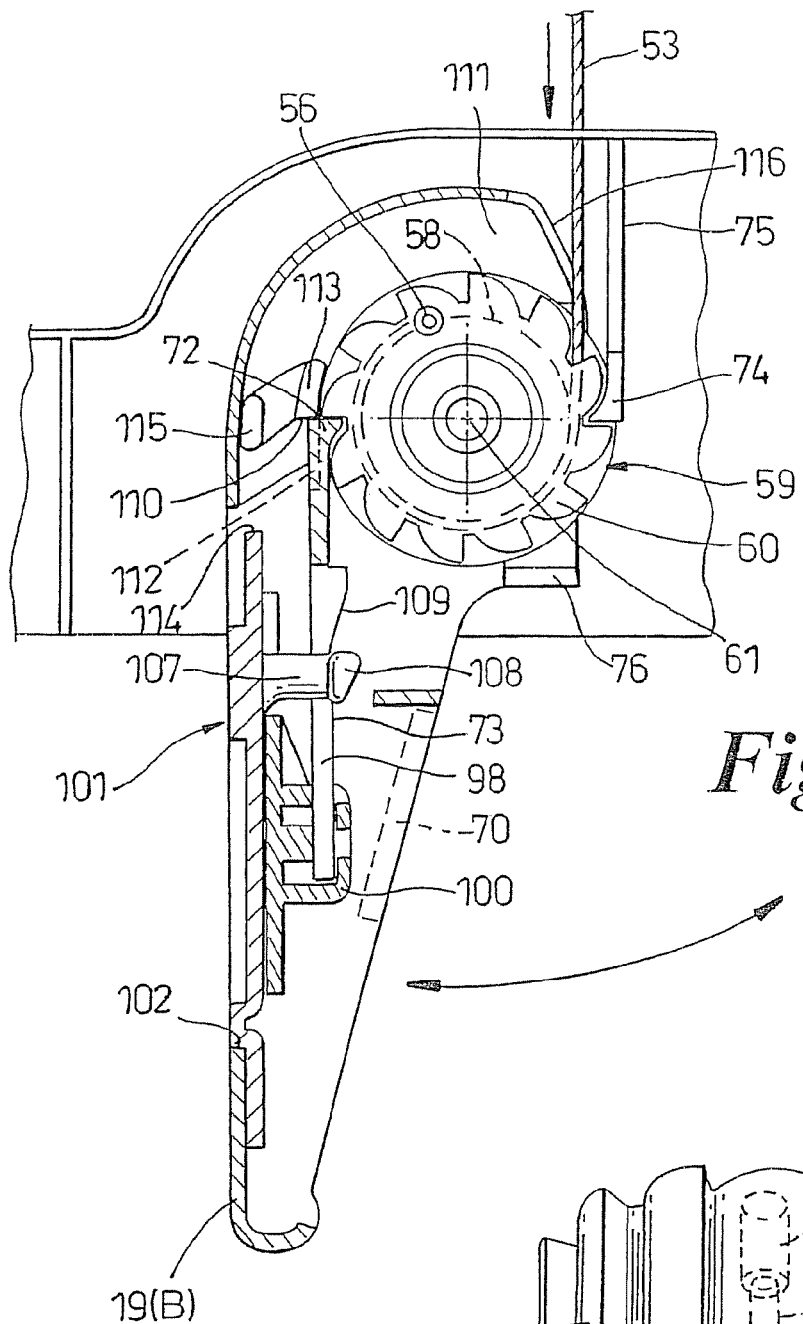
FIG. 28 corresponds to FIG. 27 but shows the lever and ratchet mechanism in operative condition.
Figure 27:
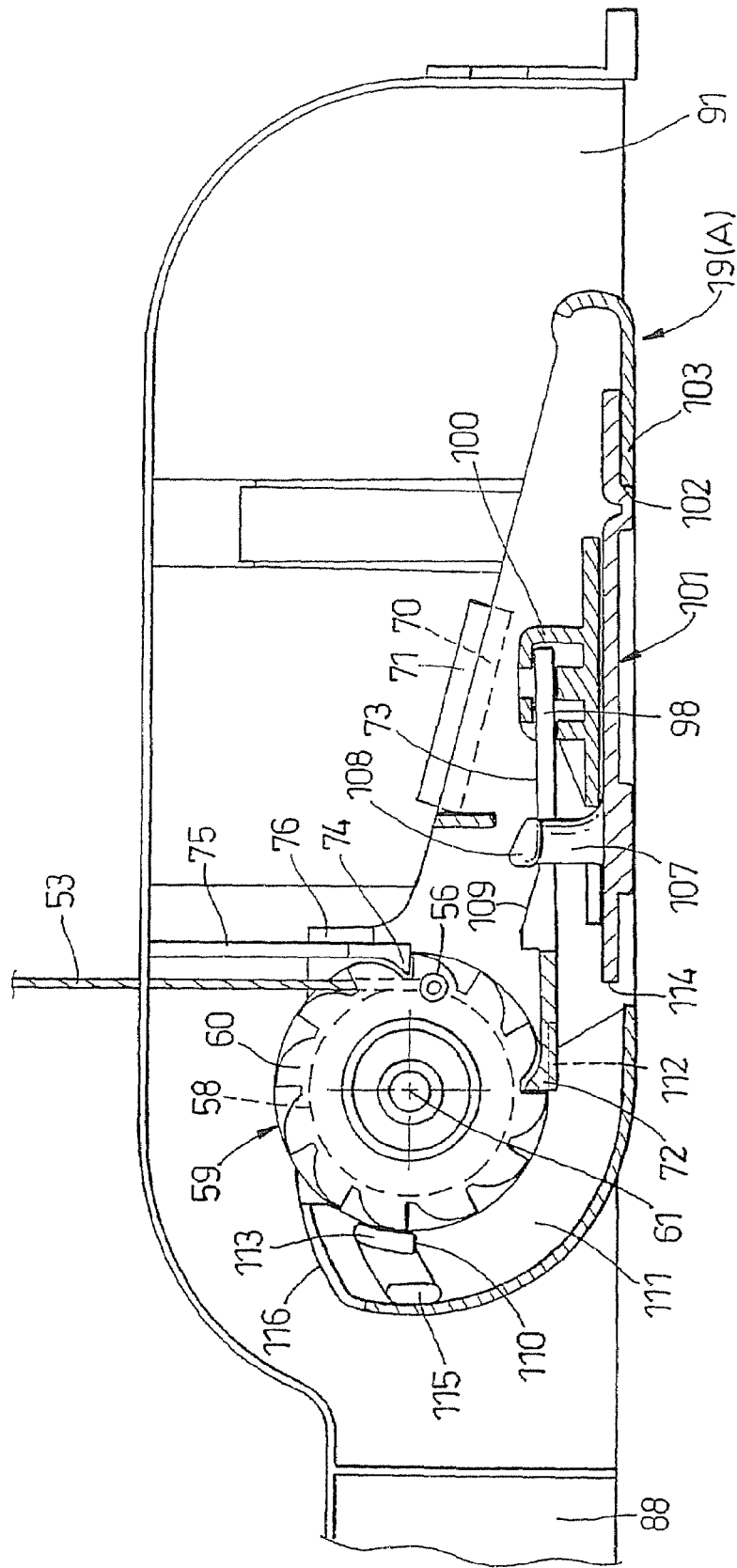
FIG. 27 is a fragmentary horizontal section through the lever showing the lever and ratchet mechanism in inoperative condition.

With the slider in the position shown in FIGS. 17 and 22 and as also in FIGS. 27 and 28, the drive pawl 72 is in engagement with the ratchet, thus enabling the lever 19 to be swung repeatedly between the positions 19(A), 19(B) to rotate the spool 59, the position 19(B) being determined by the drive pawl meeting a fixed stop 110 (see also FIG. 11) on the base of the chassis projecting up through an arcuate slot 111 in the lower flank 64 of the lever, the actual contact being between the stop and a small heel 112 projecting downwards from the drive pawl 72.

Figure 23:
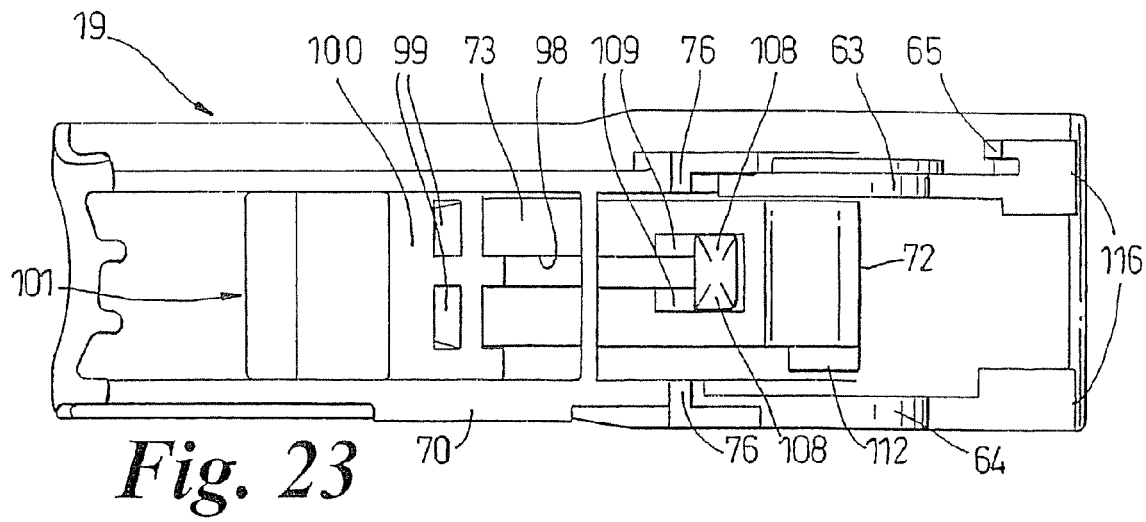
FIG. 23 corresponds to FIG. 22 but shows the slider in its pawl-releasing position.
Figure 29:
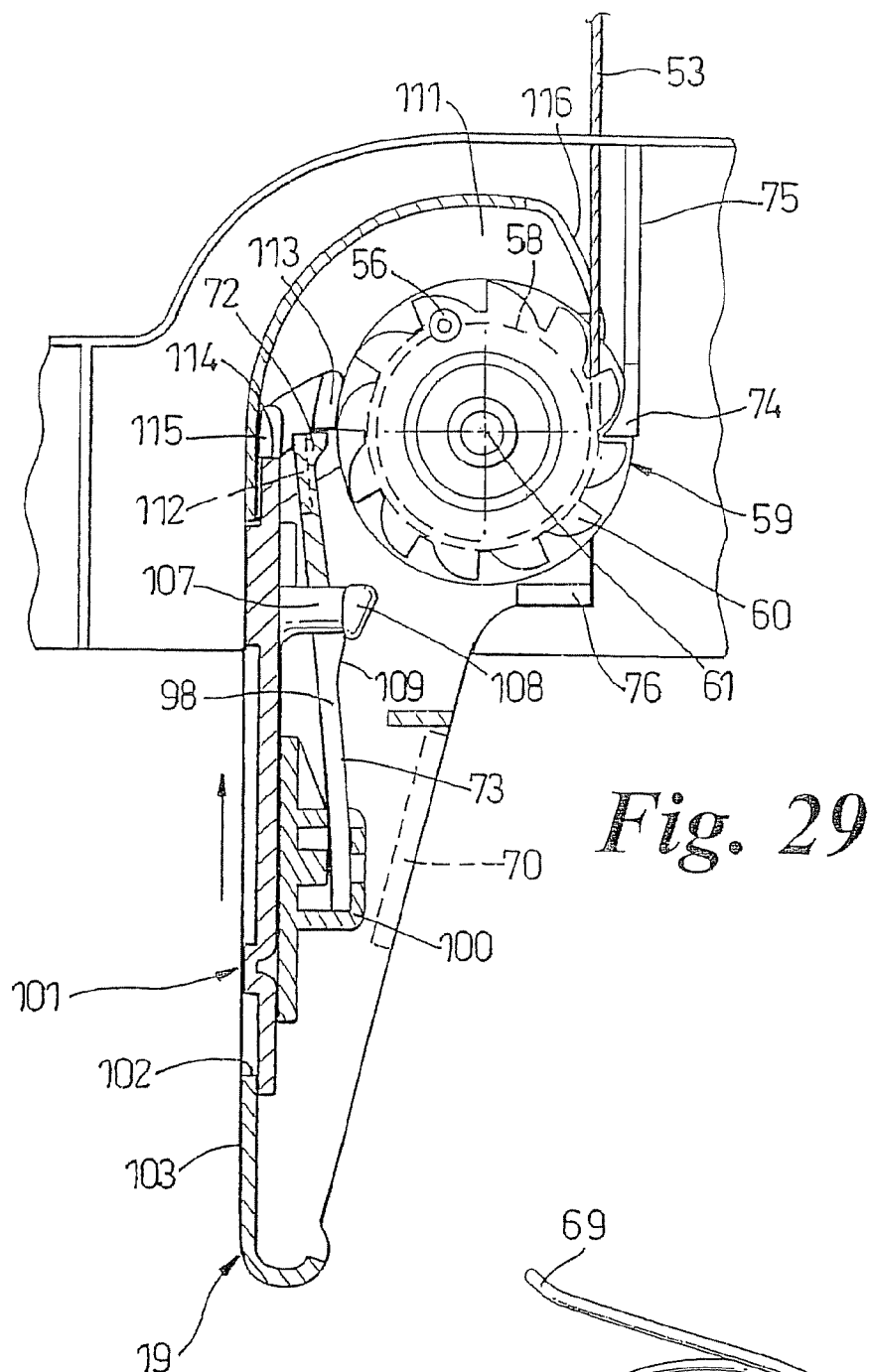
FIG. 29 corresponds to FIGS. 27 and 28 but shows the lever and ratchet mechanism in drive pawl-releasing condition.
Figure 30:
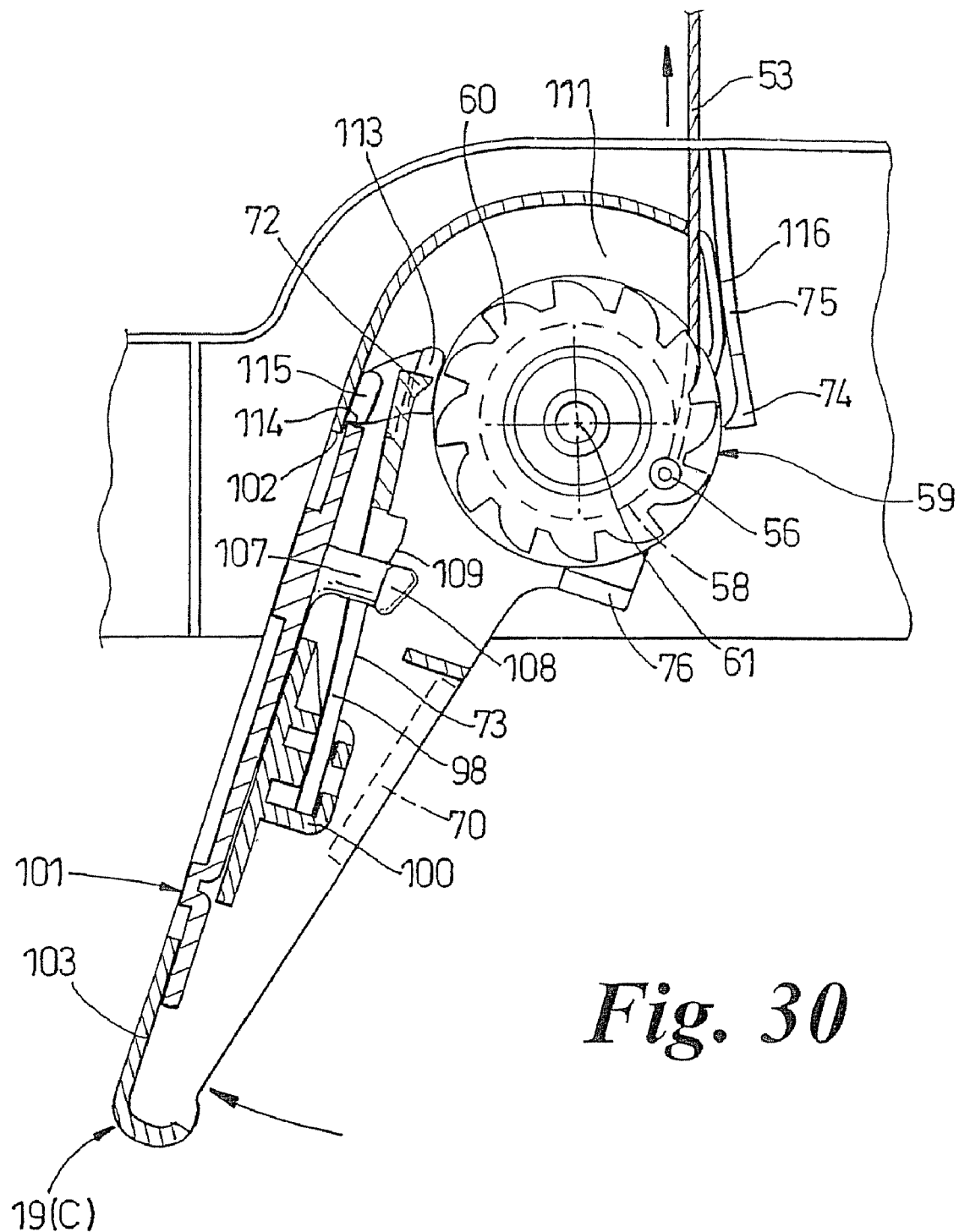
FIG. 30 corresponds to FIG. 29 but shows the lever and ratchet mechanism in latching pawl-releasing condition.

The stop 110 is at one end of a radius plate 113 along which the shoe runs when with the slider 101 moved to the position shown in FIGS. 23 and 29 the lateral projections 108 of the head 106 engage the ramps 109 on the resilient arm 73 to flex it and disengage the drive pawl 72 from the ratchet 60, and the lever is moved towards a position 19(C) shown in FIG. 30 causing two things to happen. Firstly, the leading edge 114 of the slider 101 meets a fixed abutment 115 on the base of the chassis spaced from the fixed stop 110 to urge the slider back towards its inoperative position, and, secondly, cam surfaces 116 on the lever 19 flex the second resilient arm 75 to disengage the latching pawl 74 from the ratchet.

The consequence of this latter interaction is that the coil spring 48 round the spindle 40 rotates the spindle to rewind the wire rope 53 on to the pulley 42 and, therefore, unwind it from the ratchet spool 59, and also rotate the slotted crossbar 37 to release the tension in the strap 13 thus allowing the hook 14 to be pulled clear from the platform 18 of the pallet 3. When the slotted crossbar has returned to the position shown in FIG. 9 and the strap has been completely unwound from it, the strap is then free to be rewound on to the drum 79 by the clock spring 81 and the hook 14 drawn back into the recess 88, guided by the ramping surfaces 89, 90.

Finally, when the lever 19 is released by the user, the coil spring 67 returns the lever to the position shown in FIGS. 9 and 27.

The mechanism shown in the cassette 12 is capable of generating in the strap 13 tension of the order of 175 kgs with but a few oscillations of the lever 19, the effort applied to which when moving it from inoperative position 19(A) to operative position 19(B) will at first be very slight as the first turn of the slotted crossbar 37 takes up slack in the strap 13. The return spring 81 in the drum 79 plays no part in generating the tension in the strap 13, and its loading is so slight that it offers little resistance to winding of the strap around the slotted crossbar. Because winding of the strap around the slotted crossbar occurs from both directions, as indicated by the arrows on the strap in FIG. 10, the build-up of turns on the slotted crossbar is rapid and the effort needed to move the lever from inoperative position to operative position increases with each oscillation until resistance to further driving movement indicates that adequate tension has been generated in the strap.

The underside 117 (see FIG. 2) of the lower portion 4 of the cap 1 is preferably slightly domed, i.e. it is slightly lower (e.g. by 6.0 mm) at the corners than at the center, so that, with straps 13 at the middle of the sides 5 of the cap under tension tending to cause bowing, the doming will distribute the loading of the cap more evenly across the top of the load 2 on the pallet 3 to which the cap is applied and the straps are hooked respectively. However, because the doming is so slight it cannot be illustrated, but an alternative of pads 118 is shown in broken lines in FIG. 2, which pads may be, say, 120.0 mm square and of 6.0 mm thickness.

Although, as mentioned previously, the provision of strapping strands, hooks and tensioning mechanisms in cassettes affords the option of incorporating one pair or two pairs of cassettes in a cap for use on pallets of, say, 1000.0 mm by 800.0 mm, for use with smaller pallets the cap may be of a size incapable of accommodating tensioning mechanisms for more than two strapping strands and hooks at a single pair of opposite sides of the cap, in which case formations described previously as upstanding from the chassis 43 of the cassette 12 could be upstanding directly from each of only two housings in the lower portion (or main mauling) of the smaller cap, and formations previously described as depending from the cover 45 of the cassette could depend directly from a unitary upper portion of the cap, with consequent saving in quantity, weight and cost of molded components.

The invention claimed is:

1. A cassette for incorporation in a cap for use on palletized loads, the cassette comprising a chassis and a cover, a strapping strand retractable into the cassette through an opening in the cassette, spring means within the cassette for retracting the strapping strand, a hook on a free end of the strapping strand for engagement with an underside of a platform of a pallet, stop means for limiting retraction of the hook into the cassette when not engaged with a pallet, and tensioning means within the cassette for tightening the strapping strand after interposing a load between a pallet and a cap incorporating the cassette, the tensioning means comprising a slotted crossbar through which the strapping strand passes, a lever pivoted within a side of the cassette and movable in a plane parallel to a general plane of the cassette between operative and inoperative positions, and linkage between the lever and the slotted crossbar such that movement of the lever from the inoperative position to the operative position causes rotation of the slotted crossbar to wind the strapping strand round the slotted crossbar, together with manually releasable spring-loaded latch means for securing the strapping strand in tension, and a return spring to urge the lever to the inoperative position.

2. A cassette as in claim 1, characterized in that the slotted crossbar is part of a spindle having journals for rotation in bearings formed between upstanding formations on the chassis and depending formations on the cover.

3. A cassette as in claim 2, characterized in that a pulley is also provided as part of the spindle, and a wire is secured at one end to the lever and at other end to the pulley, about which the wire is wound, movement of the lever from the inoperative position to the to operative position effecting unwinding of the wire from the pulley to cause winding of the strapping strand round the slotted crossbar, together with a return spring for re-winding the wire onto the pulley when the spring-loaded latch means is manually released to release tension in the wire.

4. A cassette as in claim 1, characterized in that a ratchet mechanism is incorporated in the linkage between the lever and the slotted crossbar, to enable repeated swinging of the lever to-and-fro to effect as many turns of the strapping strand round the slotted crossbar as may be needed for adequate tensioning of the strapping strand.

5. A cassette as in claim 4, characterized in that the slotted crossbar is part of a spindle having journals for rotation in bearings formed between upstanding formations on the chassis and depending formations on the cover; a pulley is also provided as part of the spindle, and a wire is secured at one end to the lever and at another end to the pulley, about which the wire is wound, movement of the lever from the inoperative position to the operative position effecting unwinding of the wire from the pulley to cause winding of the strapping strand round the slotted crossbar, together with a return spring for re-winding the wire onto the pulley when the spring-loaded latch means is manually released to release tension in the wire; and the lever is bifurcated and there is provided a spool with a ratchet extending from one end to a circumferential groove adjacent another end into which the wire from the pulley is reeved, the lever and the spool being rotatable about a fixed common axis in the cassette and the lever being rotatable with respect to the spool, a ratchet drive pawl on a first resilient arm mounted in the lever, a latching pawl on a second resilient arm mounted in the chassis to latch the ratchet at times when it is not being rotated by driving action of the lever through the drive pawl, a fixed stop on the chassis for limiting swinging of the lever from the inoperative position, manually operable means on the lever for disengaging the drive pawl from the ratchet, and a cam on the lever for disengaging the latching pawl from the ratchet after the drive pawl has encountered and rides along a fixed radius plate on the chassis beyond the stop means.

6. A cassette as in claim 5, characterized in that the manually operable means for disengaging the drive pawl from the ratchet comprises a slider movable in the lever towards and away from the drive pawl, with a head on a neck passing through a slot in the first resilient arm, the head having lateral projections engaging ramps on each side of the slot when the slide is moved towards the drive pawl.

7. A cassette as in claim 6, characterized in that a fixed abutment is provided on the chassis spaced from the fixed stop to be engaged by the slider to urge it back towards an inoperative position as the drive pawl rides along the radius plate.

8. A cassette as in claim 1, characterized in that the strapping strand is a strap having an end remote from the hook secured to a barrel of a drum on an axis perpendicular to the general plane of the cassette and the strap twists through 90° between the drum and the slotted crossbar, with a spring within the drum for retracting the strap when it is free to run through the slotted crossbar.

9. A cassette as in claim 1, characterized in that the opening in the cassette for passage of the strapping strand is at the back of a recess in the cassette of a depth front-to-back to receive fully the respective hook, and the bottom of the recess is provided with ramping surfaces to effect automatic parking of the hook into the recess upon retraction of the strapping strand into the cassette.

10. A cassette as in claim 1, characterized in that the hook has two prongs spaced apart for location to each side of a middle spacer of a pallet and cranked out from a mid-portion of the hook commensurate with the width of the strapping strand secured around it.

11. A cassette as in claim 10, characterized in that the hook is provided with a bracing bar parallel to the mid-portion to aid placement on to a pallet by a toe of footwear of a user.

12. A cassette as in claim 11, characterized in that the strapping strand extends beyond the bracing bar for grasping by a user's hand.

13. A cassette as in claim 11, characterized in that the strapping strand terminates at the mid-portion of the hook and a separate tab is provided on the bracing bar for grasping by a user's hand.

* * * * *